Figure 1:
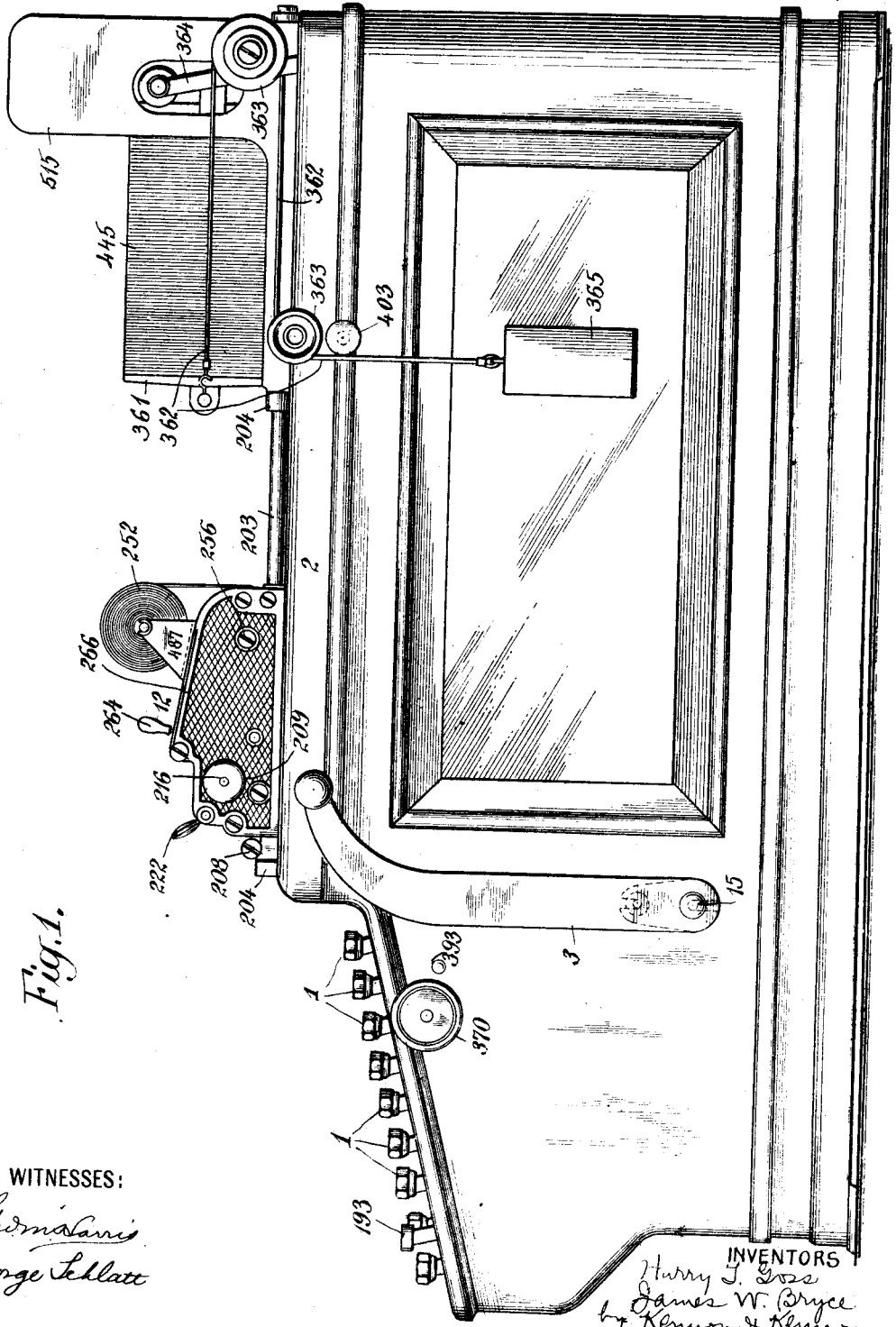

H. T. GOSS & J. W. BRYCE.
ADDING MACHINE.
APPLICATION FILED DEC. 29, 1911.

1,190,752.

Patented July 11, 1916.
17 SHEETS—SHEET 3.

H. T. GOSS & J. W. BRYCE.
ADDING MACHINE.
APPLICATION FILED DEC. 29, 1911.

1,190,752.

Patented July 11, 1916.
17 SHEETS—SHEET 4.

H. T. GOSS & J. W. BRYCE.
ADDING MACHINE.
APPLICATION FILED DEC. 29, 1911.

1,190,752.

Patented July 11, 1916.
17 SHEETS—SHEET 8.

WITNESSES

INVENTORS
Harry T. Goss
James W. Bryce
By Kenyon & Kenyon
ATTORNEYS

H. T. GOSS & J. W. BRYCE.
ADDING MACHINE.
APPLICATION FILED DEC. 29, 1911.

1,190,752.

Patented July 11, 1916.
17 SHEETS—SHEET 9.

WITNESSES:

INVENTORS
Harry T. Goss
James W. Bryce
BY
Kenyon & Kenyon
ATTORNEYS

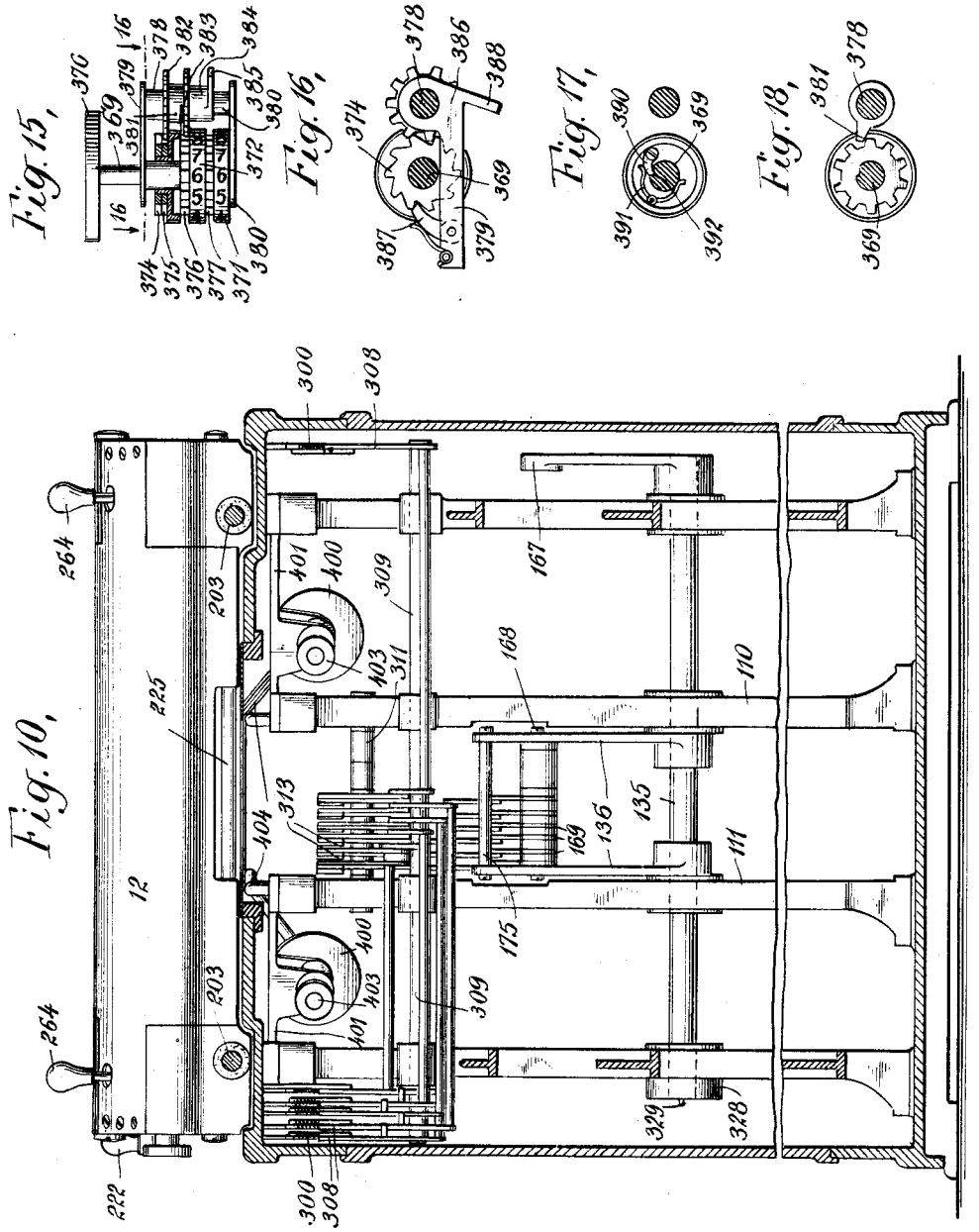

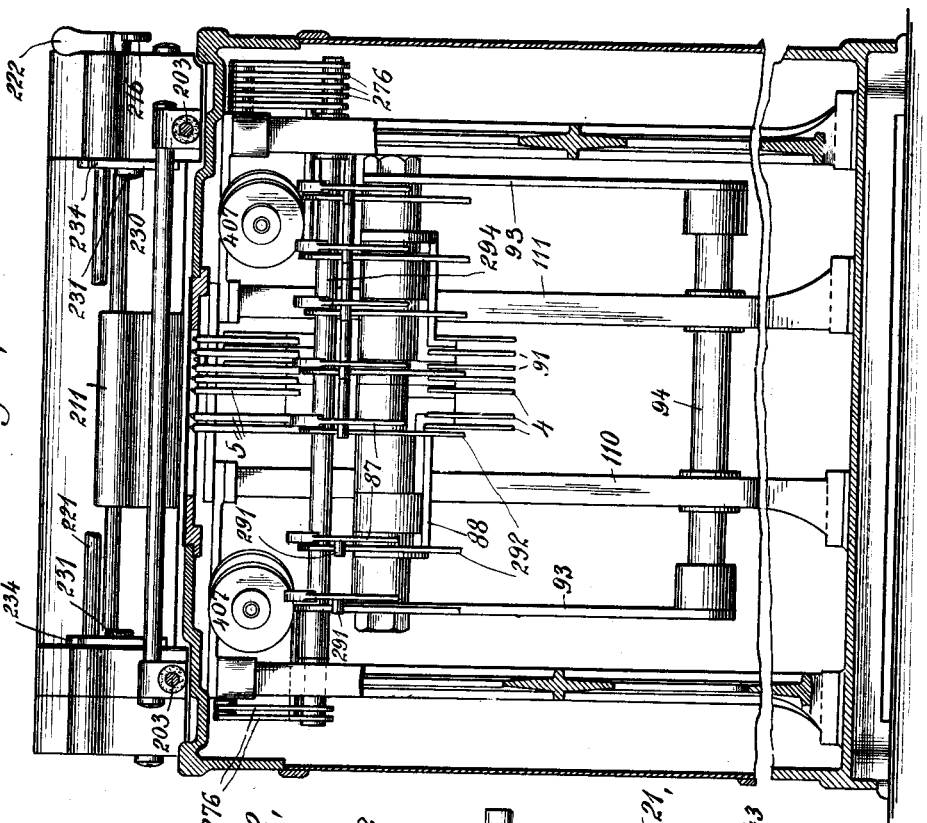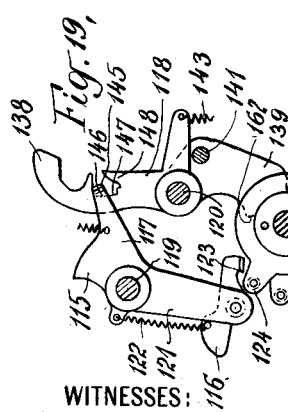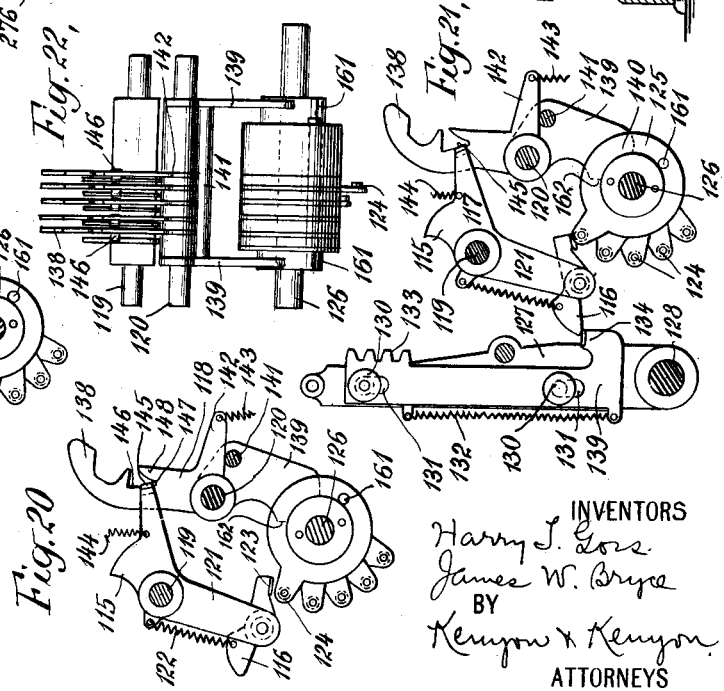

H. T. GOSS & J. W. BRYCE.
ADDING MACHINE.
APPLICATION FILED DEC. 29, 1911.
1,190,752.
Patented July 11, 1916.
17 SHEETS—SHEET 12.
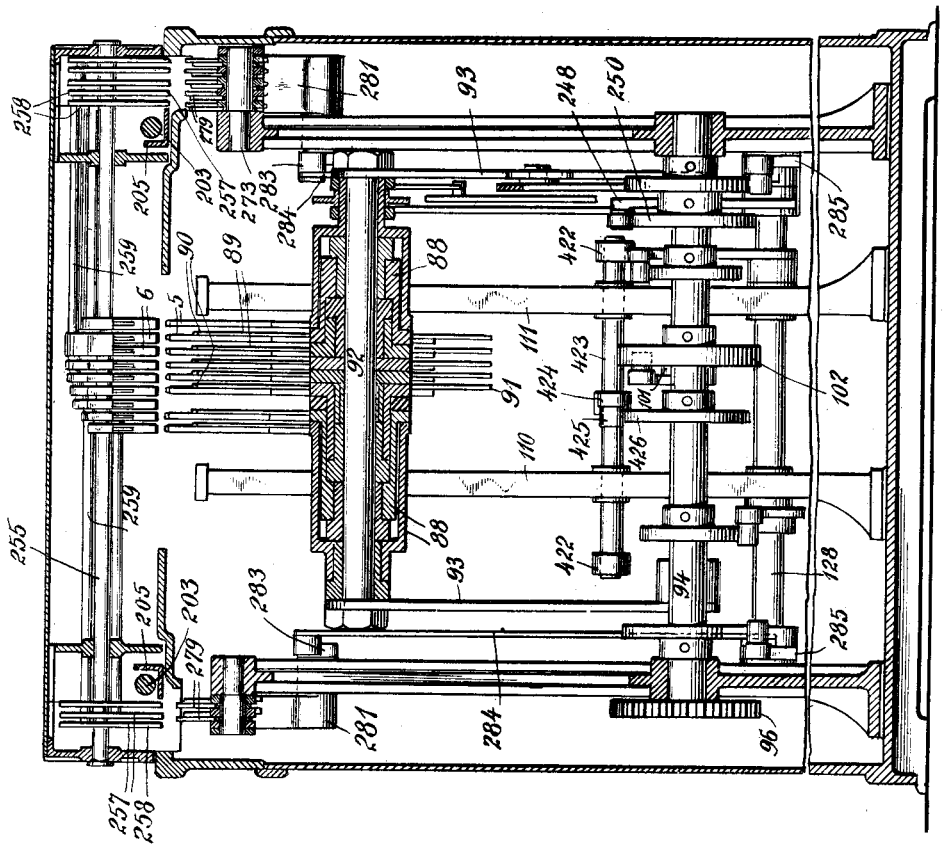
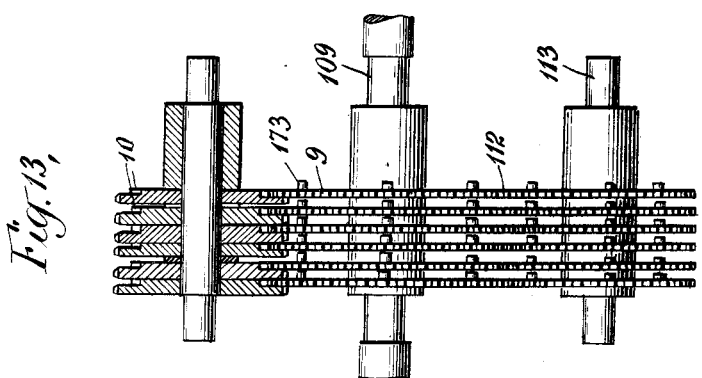
WITNESSES:
INVENTORS
Harry T. Goss
James W. Bryce
BY
Kenyon & Kenyon
ATTORNEYS

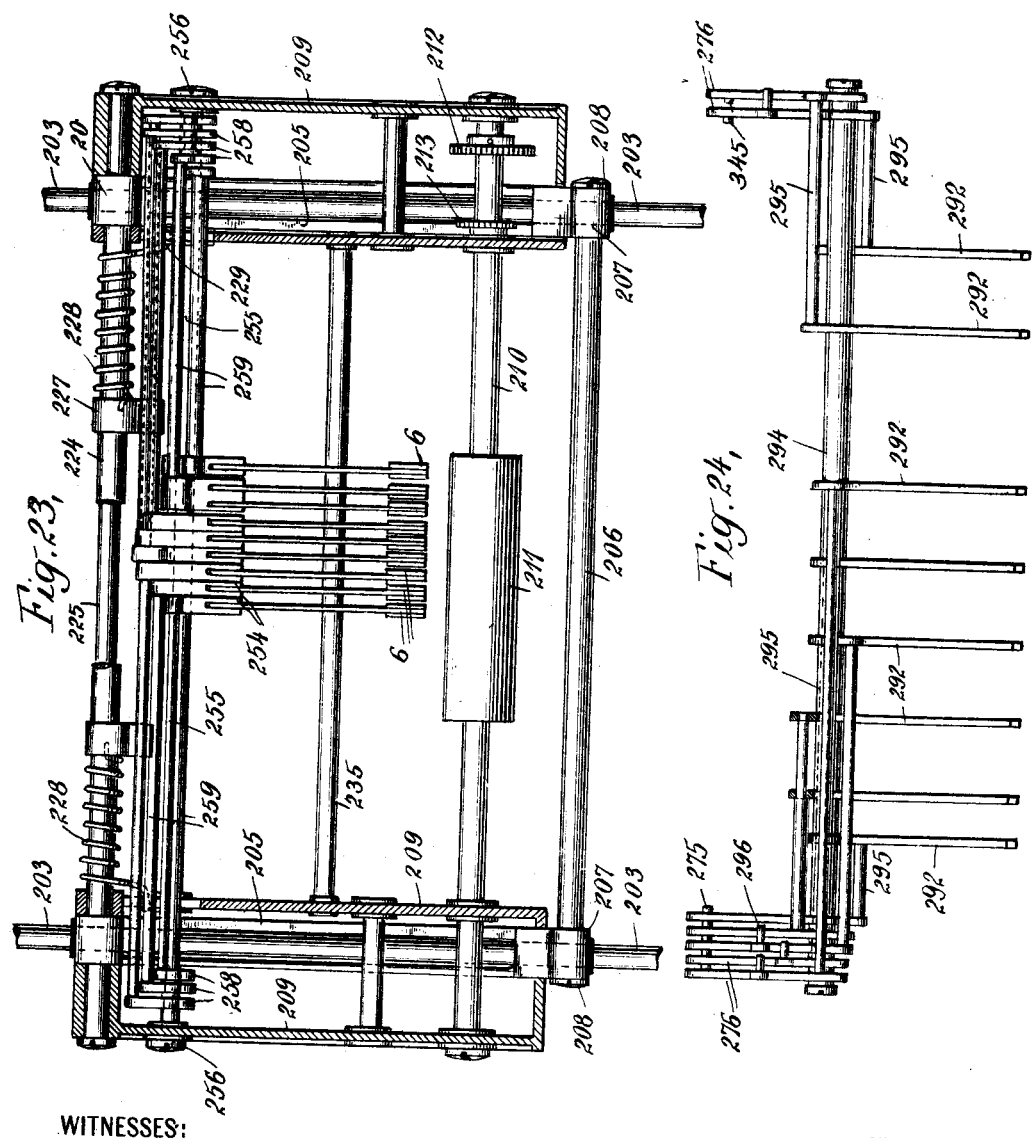

H. T. GOSS & J. W. BRYCE.
ADDING MACHINE.
APPLICATION FILED DEC. 29, 1911.
1,190,752.
Patented July 11, 1916.
17 SHEETS—SHEET 14.
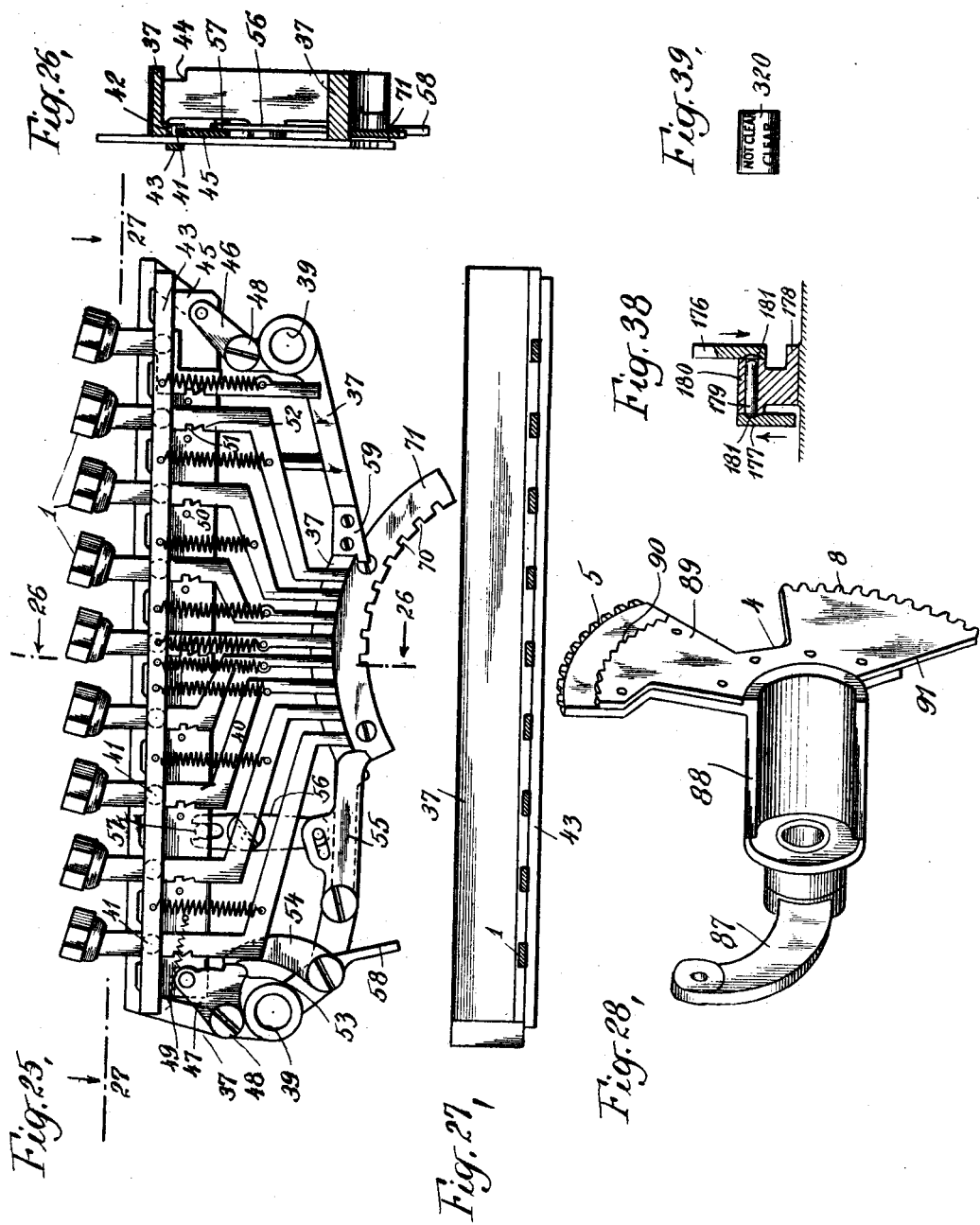
WITNESSES:
INVENTORS
Harry T. Goss
James W. Bryce
BY
Kenyon & Kenyon
ATTORNEYS

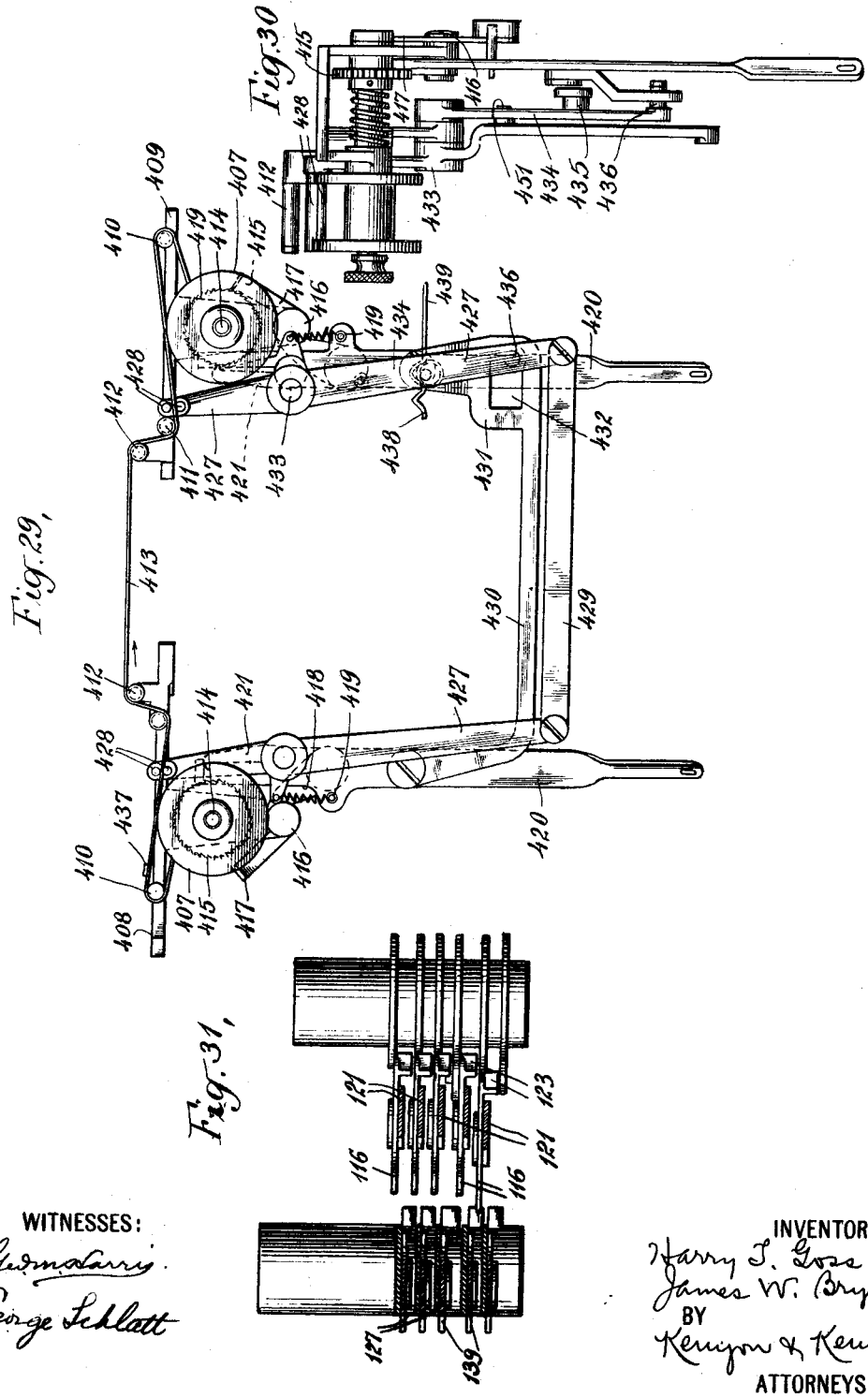
H. T. GOSS & J. W. BRYCE.
ADDING MACHINE.
APPLICATION FILED DEC. 29, 1911.
1,190,752.
Patented July 11, 1916.
17 SHEETS—SHEET 15.

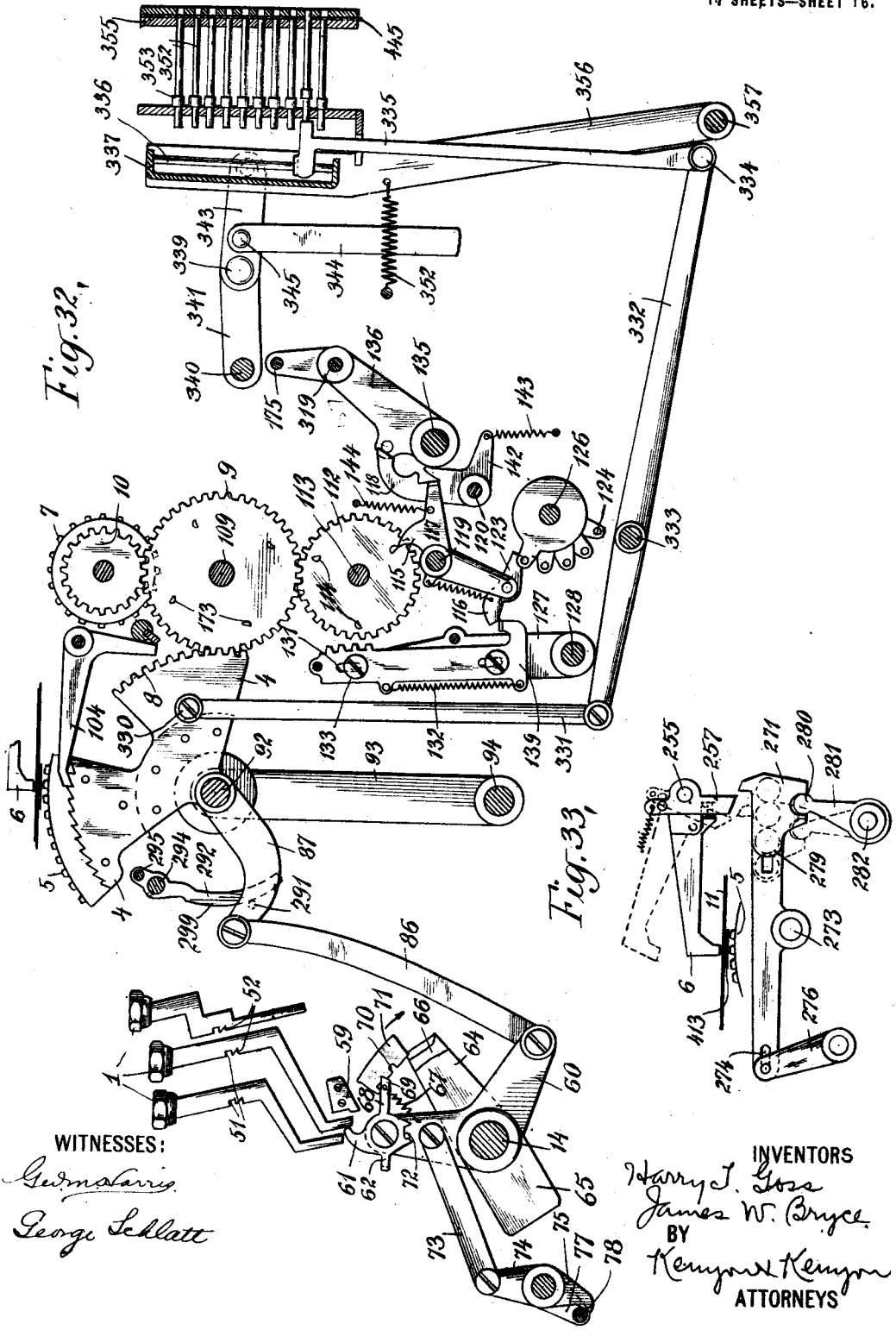

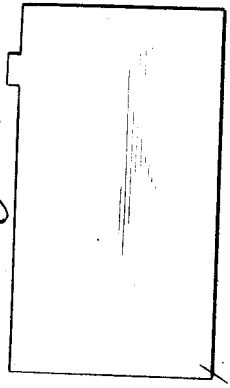
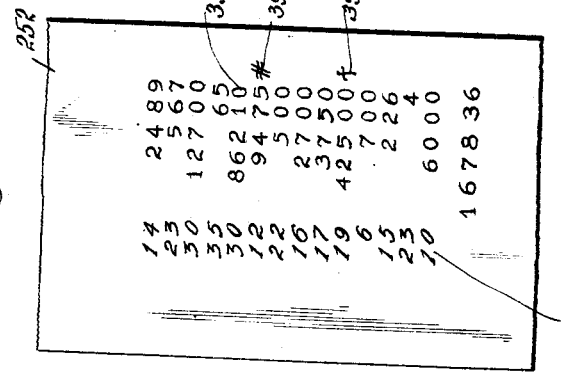

UNITED STATES PATENT OFFICE.

HARRY T. GOSS, OF RUTHERFORD, AND JAMES W. BRYCE, OF BLOOMFIELD, NEW JERSEY, ASSIGNORS TO INTERNATIONAL TIME RECORDING COMPANY OF NEW YORK, OF ENDICOTT, NEW YORK, A CORPORATION OF NEW YORK.

ADDING-MACHINE.

1,190,752.  Specification of Letters Patent.  Patented July 11, 1916.

Application filed December 29, 1911. Serial No. 668,423.

*To all whom it may concern:*

Be it known that we, HARRY T. Goss and JAMES W. BRYCE, citizens of the United States, the former a resident of Rutherford, in the county of Bergen and State of New Jersey, and the latter a resident of Bloomfield, in the county of Essex and State of New Jersey, have invented certain new and useful Improvements in Adding-Machines, of which the following is a specification.

Our invention relates to adding machines. It is of special value in adding machines where different items are recorded, each with its own identifying character, and where such items are totalized as they and their identifying characters are recorded.

The object of our invention is, in connection with the recording or totalizing or both of such items and the recording of their identifying characters, to punch holes in a suitable surface, preferably removable cards, which holes shall, by their location on such surface or card, represent the values of the different items recorded or totalized and of their respective identifying characters, and which surface or cards may thereafter be passed through an integrating machine for obtaining sub-totals of any or all of the groups represented by the identifying characters.

It has also for its object to give or record, or both, suitable indications or signals showing whether a card has been inserted or not, and whether properly inserted, and also to provide suitable detecting and recording mechanism for that purpose, to the end that the omission or error may promptly be discovered and rectified; also, to provide improved removable cards for use in such machines; also, to provide automatic means for individually feeding cards to the punching mechanism.

Our invention consists in the novel devices and combinations herein shown and described.

In the drawings accompanying this specification and forming part hereof, we have shown one form or embodiment of our invention which we will now proceed to describe.

Our invention as there shown is embodied in a machine in which the mechanisms for recording items and their identifying characters are shown as type-sectors, the differential punching mechanism as composed of different sets or series of punches representing different denominations of value, each set composed of a number of units, and each set provided with a punch selector adapted to operate differentially, the totalizing device as a series of adding wheels and the manually operated controlling devices for controlling the recording, totalizing and punching mechanisms as composed of an operating handle and connections and two banks of keys of the usual character, one for the item recording mechanism and one for the identifying characters arranged to bring upon a printing line, opposite a suitable record strip, numbers corresponding to the value of the item and character-identifying keys depressed, and to print said numbers upon the record strip, to add such numbers upon the set of adding or totalizing wheels, and to punch in a suitable record surface, preferably a removable card, a record of each separate item and its identifying character set up on the keyboard. The record card or strip is adapted for future use in tabulating or statistical work in connection with the items listed and their identifying characters.

Figure 2:
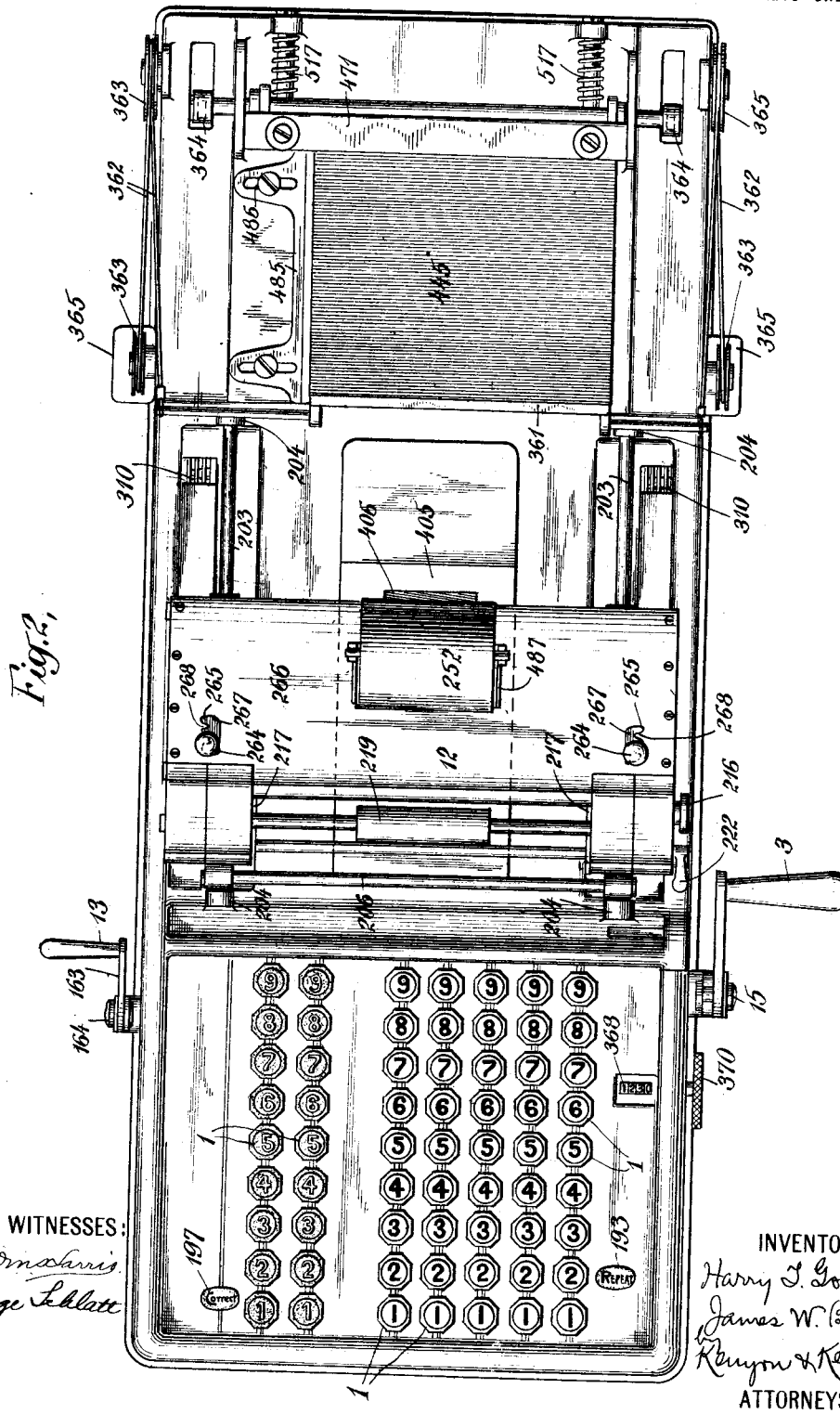
Figure 3:
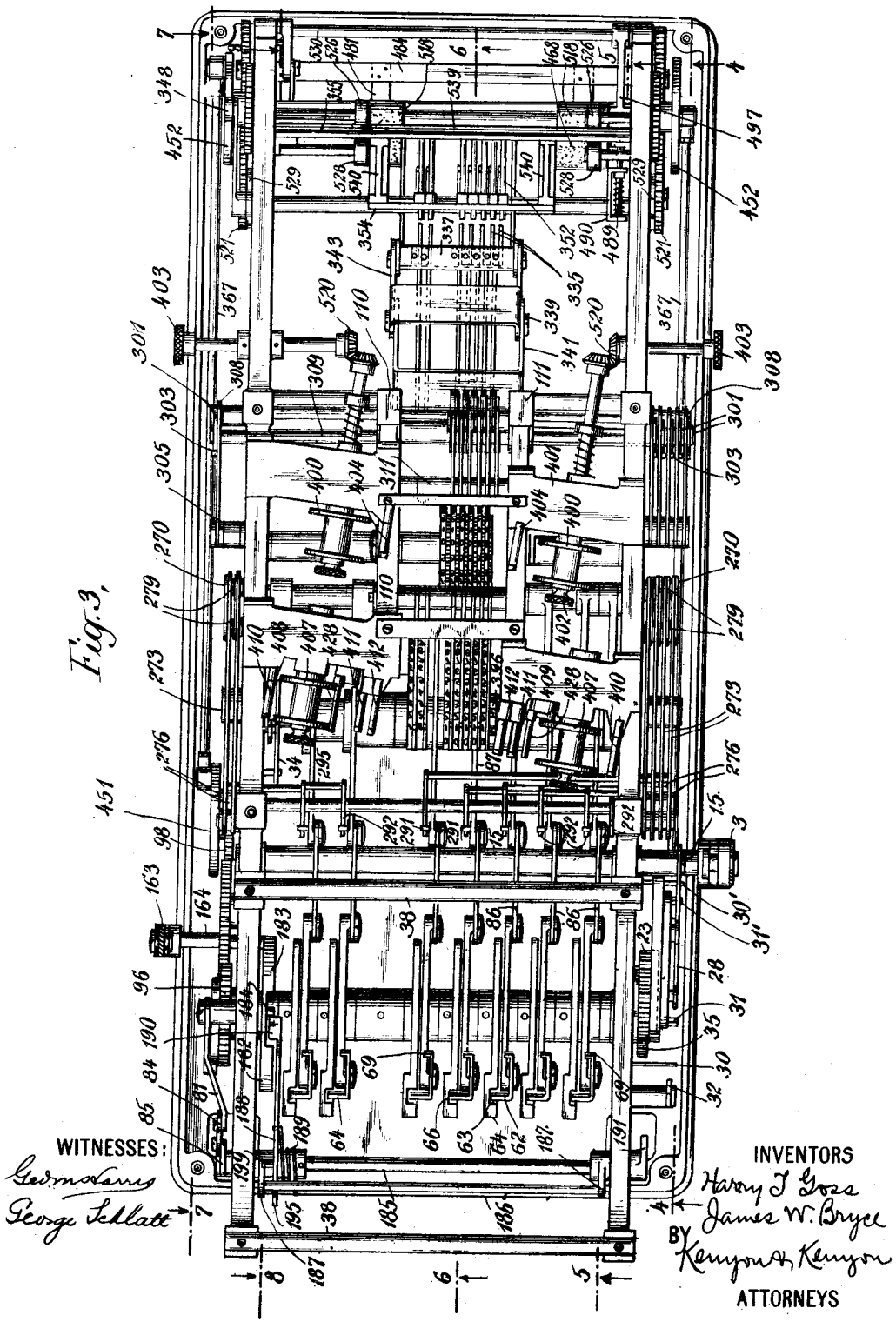
Figure 4:
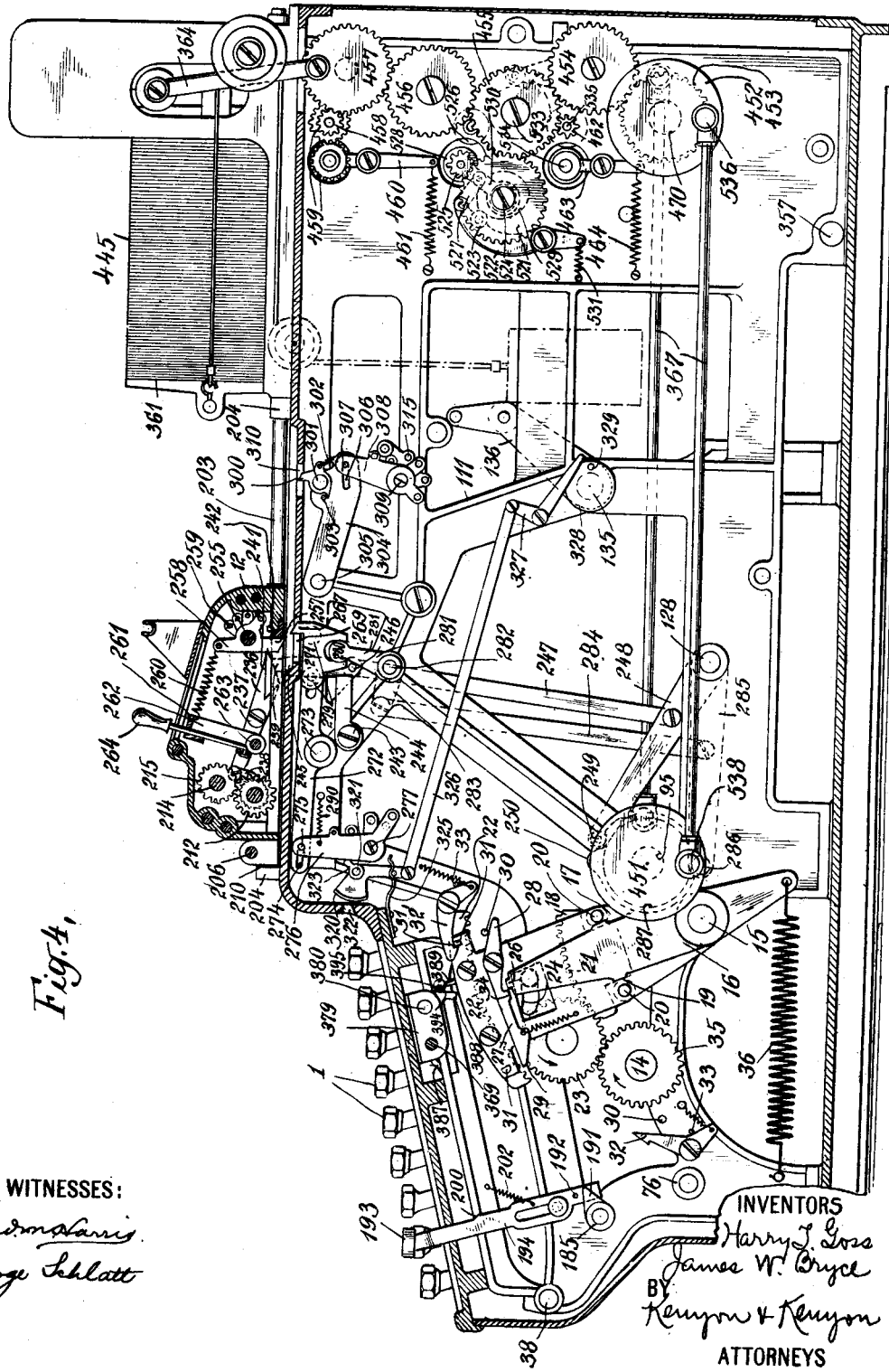
Figure 5:
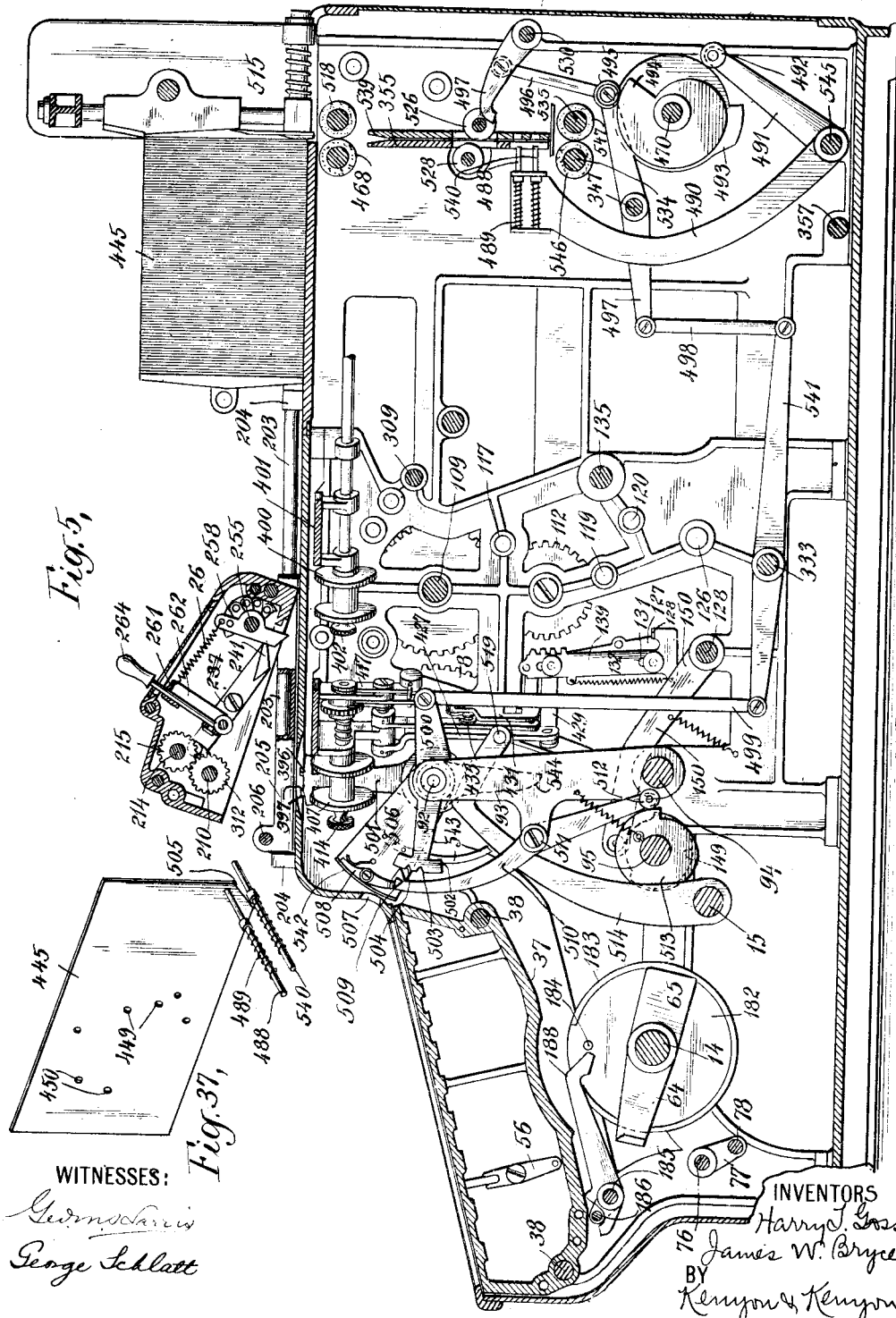
Figure 6:
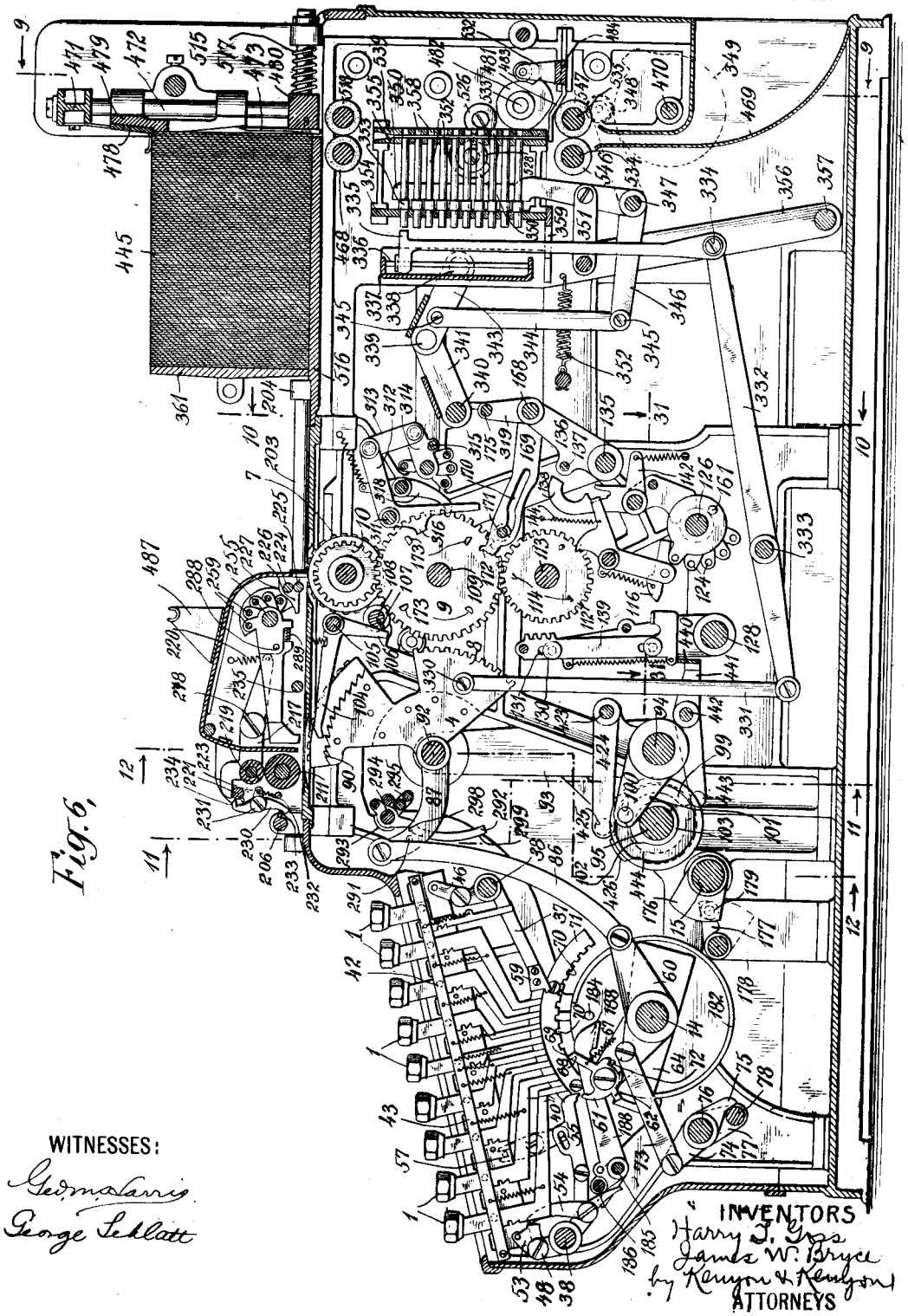
Figure 7:
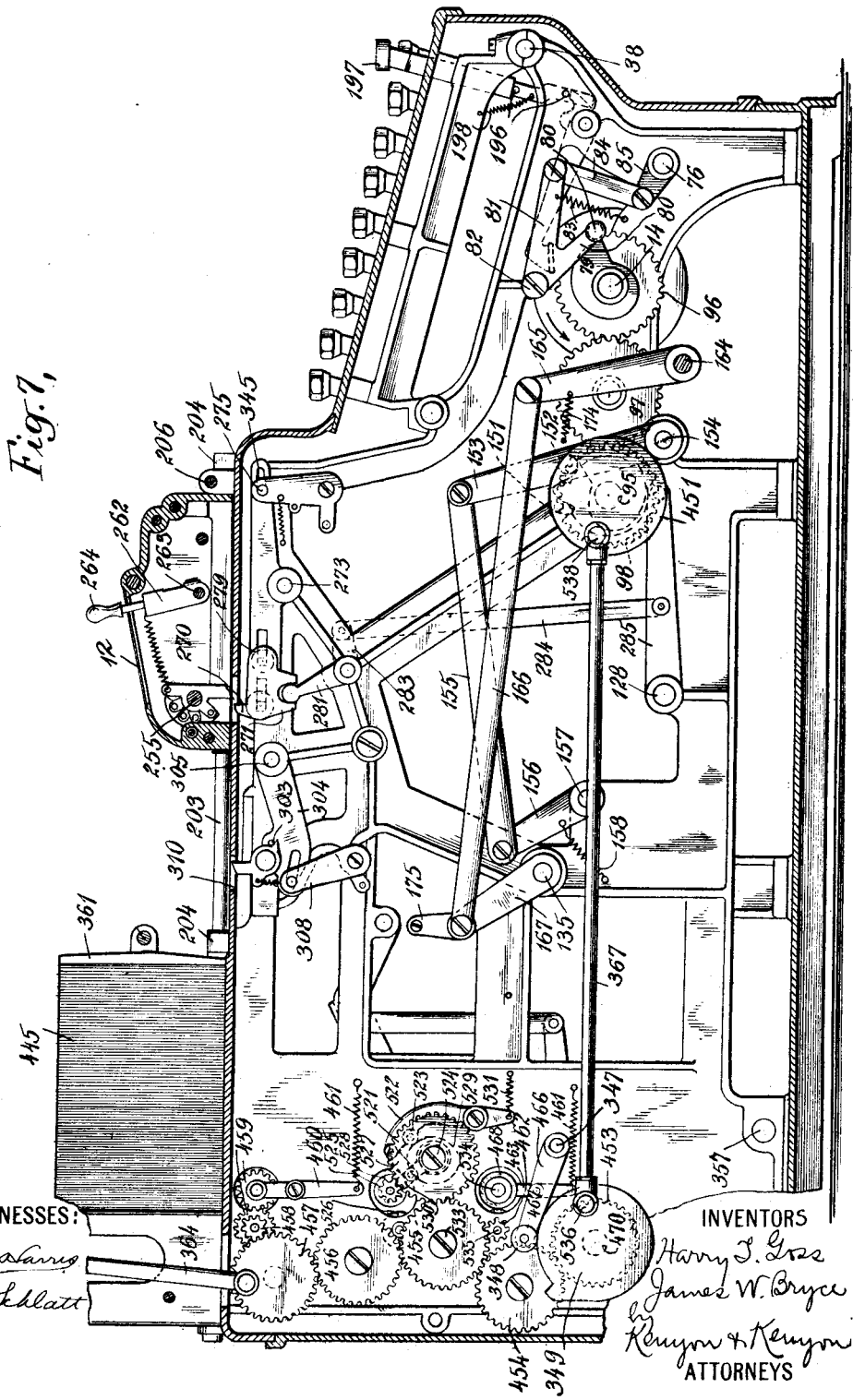
Figure 8:
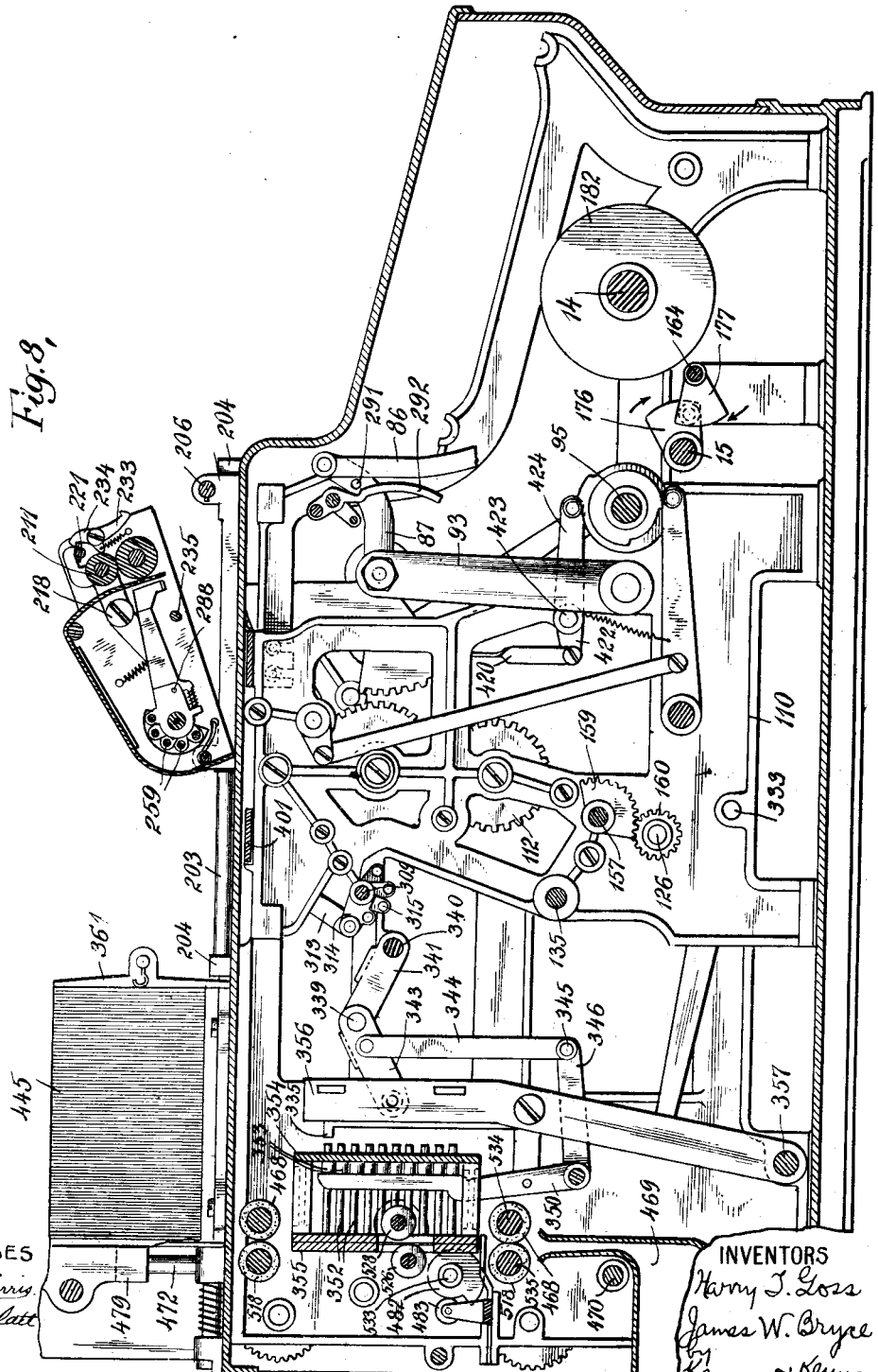

Referring now to the drawings of such form of machine, Figure 1 is a side view of such machine; Fig. 2 is a plan; Fig. 3 a plan of the interior with the top plate and the keyboard sections removed; Fig. 4 a vertical longitudinal section on the line 4—4 of Fig. 3; Fig. 5 a similar section on the lines 5—5 of Fig. 3; Fig. 6 is a central longitudinal section on the lines 6—6 of Fig. 3; Fig. 7 is a side elevation of the mechanism looking in the direction of the arrows of line 7—7, Fig. 3; Fig. 8 is a longitudinal section on the lines 8—8 of Fig. 3, looking in the same direction as Fig. 7; Fig. 9 is a rear view of a portion of the inside of the machine, showing a rear view of the punching and card feeding mechanism; Fig. 10 is a cross section on the line 10—10 of Fig. 6; Fig. 11 is a cross section, looking toward the rear of machine, on the line 11—11 of Fig. 6, showing a front view of the individual type sectors and their connections, and showing a front view of the carriage; Fig. 12 is a vertical cross section on the lines 12—12 of Fig. 6, giving a section of the individual type sectors and their mountings, and an elevation of the main cam shaft; Fig. 13 is a detail front view of the adding wheels and the total type wheels, the latter being in section; Fig. 14 is a detail horizontal section of the card receiver, punches and punch-operating selectors and the detector pins; Figs. 15-18 are detail views of the counter; Fig. 15 being a bottom view partially in section; Fig. 16 a cross section on the line 16—16 of Fig. 15; Figs. 19, 20 and 21 are details of the carrying mechanism showing successive positions of the parts in operation of the machine; Fig. 22 is a rear view of the same; Fig. 23 is a horizontal section of the carriage taken just above the hammers showing the carriage removed from the machine but mounted upon a portion of the slide rods; Fig. 24 is a rear view of the crossover rods and connections; Fig. 25 is a side elevation of one of the key section units or series of keys; Fig. 26 is a cross section on the line 26—26 of Fig. 25; Fig. 27 is a horizontal section of the key mechanism taken on the line 27—27 of Fig. 25; Fig. 28 is a perspective view of an individual type sector; Fig. 29 is a front view of the front inking ribbon mechanism; Fig. 30 is a side view of same; Fig. 31 is a horizontal section on the line 31—31 of Fig. 6 showing a part of the carrying mechanism; Fig. 32 is a diagrammatic or skeleton view showing the position of one series of devices in the position they assume when the 8 key has been depressed and the machine operated by means of its main handle; Fig. 33 is a detail showing the action of one of the hammers; Fig. 34 is a view of a record card before it has been used in the machine; Fig. 35 is face view of a record card which has had an item and its identifying character or number recorded thereon by punching holes in predetermined positions; Fig. 36 is a view of a portion of the record strip which has been printed in the machine; Fig. 37 (on page of Fig. 5) is a diagrammatic perspective view showing the detector pins in their relation to the record card; Fig. 38 (on page of Fig. 25) is a sectional view of the interlock for the handles; Fig. 39 is a face view of the clearing signal; and Fig. 40 shows a modified form of card.

Before proceeding to describe in detail the various parts of the machine, we will briefly state how the machine operates.

As shown in the drawing, the keyboard has two sets or banks of keys; one consisting of five rows for adding, printing and punching items, in the present case numbers representing dollars and cents, and one set of two rows for printing and punching characters for identifying the different items, in this case key or identifying numbers, in front of the individual items. The operator first depresses such of the keys as represent the item or amount he wishes to print or add, and keys representing its identifying number. The keys depressed are locked in their down position and the operation of any key of a series locks, in their up position, all the other keys of the same series, preventing the depression of more than one key in the same series. He then pulls forward the handle, secured to a lever 3, as far as it will come and then pushes it backward or permits it automatically to return to its backward or normal position. This moves such of the type sections 4 (see Fig. 32) as correspond to the different series of keys, in which keys have been depressed, a distance corresponding to the value of the respective keys that have been depressed bringing those type 5, carried by the type sectors corresponding to the value of the corresponding keys depressed, upon the printing line underneath one of a series of hammers 6, and at the same time adding the same numbers upon a series of total adding wheels 7 by means of a sector gear 8, mounted on each type sector 4, and through an intermediate series of adding wheels 9, meshing with gears 10 secured to total adding wheels 7. The movement of the type sectors 4 causes the punch selectors 335 to move to a corresponding position opposite the proper punches 352 and cams driven from the operating handle cause the punches to perforate the corresponding holes in the record card which has been presented to the punches by means of the feeding rolls 468 and 518. The movement of the handle also causes such of the hammers 6, as are tripped in a manner to be hereinafter described, to print the numbers set upon the printing line upon any suitable record strip, such as the strip 252. The operation of the handle also returns all of the parts to their original or normal positions and at the same time delivers the punch record card by means of the feed rolls 546 and 547 to the chute 469 where it can be removed from the machine. The operation of the handle also feeds the paper strip and an inking ribbon. The result of the operation is to print upon the strip the number represented by the keys depressed, to punch corresponding data on a record card, and to add the same number upon the total adding wheels.

If the operator desires to print a total at any time he pushes the carriage 12, which contains the hammers and some other parts of the printing mechanism, backward along the top of the machine until the hammers 6 are over the top of the total adding wheels 7. This operation effects the printing of the total upon the paper strip leaving a space between the total and the items of the account above it as shown in Fig. 36. On the return of the carriage to its forward position the paper is fed to leave a space between said total and the items of the next account. The operator can at any time by moving a reset handle 13, reset the adding wheels at zero.

We will now proceed to describe in detail the different parts of the machine.

*The driving mechanism.*—This is more particularly illustrated in Figs. 1 to 8 inclusive. In the driving mechanism of our machine, we provide a driving member adapted to rotate in one direction only, which, as shown, is the main driving shaft 14, a reciprocating member for imparting motion to the driving member, as shown, a rock shaft 15, to which a reciprocating handle 3 is secured, and we provide connections between the two shafts for transferring the rocking movement of one into the continuous rotation of the other. These connections are so arranged and adapted that the movement of the lever 3 in one direction will cause the main driving shaft 14 to be rotated a different amount from that imparted to it by the movement of said handle in the opposite direction. We prefer to arrange the parts so that the forward or initial movement of the lever 3 will rotate shaft 14 the greater distance and in the arrangement shown in the drawings that forward movement will rotate shaft 14 two-thirds of a complete revolution, while the return movement of lever 3 to its original position will rotate the shaft the remaining one-third of a complete revolution. The connections shown for this purpose are as follows: 16 is a plate fast to shaft 15. 17 is a plate loosely mounted on the shaft. Slidingly mounted on plate 17 is a slide plate 18, having an extension 19 movable between studs 20 of plate 17. Slide plate 18 is capable of a sliding movement on plate 17. This sliding plate is provided with two reversely acting sets of gearing 21 and 22. These sets of gearing are arranged at different radial distances from the center of the rock shaft 15 and when operative are concentric therewith, one gearing 21 facing outward from the center, the other facing inward. These gears 21 and 22 are so arranged that if the sliding plate is in its outward radial position gear 21 will mesh with a gear wheel 23 and gear 22 will be out of mesh, while if the sliding plate is in its inward radial position gear 22 will mesh with the opposite side of gear wheel 23 and gear 21 will be out of mesh. Means are provided for throwing one of these sets of gears into mesh with gear wheel 23 when the rock shaft rotates one way and the other into mesh when it rotates the other way. In sliding plate 18 there is a cam slot 24 in which works roller 25 attached to plate 16. The upper part of plate 16 has a tooth 26. Mounted on plate 17 is a pawl 27 which has an extension 28 at the right and an extension 29 at the left. The cam surfaces on these extensions are adapted in the different positions of the parts to strike pins 30 and 30' mounted on the side frame of the machine. Mounted on plate 17 are two pins 31 and 31' and coacting with these pins but mounted on the side frame are two pawls 32 and 32' which are spring actuated and have limiting stop pins 33, 33. Pawl 27 has a tooth 34 coacting with tooth 26 of plate 16. The operation of these devices is as follows: In the position shown in Fig. 4, which is the normal position before the operation of the machine, pawl 27 is against pin 30 and tooth 34 is raised out of engagement with tooth 26, pawl 32 is hinged to pin 31; gear 21 is in mesh with gear wheel 23 while gear 22 is out of mesh. The forward movement of handle 2 will cause roller 25 on plate 16 to move forward. The slope of the cam slot 24 is such that this first movement of the handle will move sliding plate 18 inwardly taking gear 21 out of mesh with gear 23 and putting gear 22 into mesh with it on its opposite side. The slight further movement of the handle will cause extensions 28 of pawl 27 to free its upper pin 30 and the tooth 34 will drop out from behind tooth 26. Before this takes place plate 16 will have moved forward or to the left a sufficient distance to bring the tooth 34 back of tooth 26. By this time roller 25 will have reached the forward end of slot 24. In this position of the parts roller 25 in slot 24 on one side of teeth 26 and 34 will rigidly and positively lock plates 16 and 17 so that forward movement of plate 16 will cause the movement of plate 17 and its connections the same as if the parts formed one rigid structure. This rigidity is important in securing accurate and reliable working of the machine. Further forward movement of the handle will cause gear wheel 23 to rotate in the direction of the arrow which will rotate gear 35 in the direction of its arrow, rotating main driving shaft 14 in the same direction. When handle 2 has reached its forward position pin 31 locks into pawl 32, the end 29 of pawl 27 rides up against pin 30 and frees plate 16 from plate 17 preparing the parts for the return movement. When handle 2 begins its backward movement plate 16, being free from plate 17, roller 25 moves to the opposite or rear end of slot 24 throwing gear 22 out of mesh with gear wheel 23 and gear 21 into mesh and freeing pin 31 from pawl 32 permitting the return of plate 17 and its connections, while the movement of the parts to the rear frees extension 29 from pin 30 and permits tooth 34 to drop downward. By this time tooth 26 has moved to the rear of tooth 34 and the latter drops down in front of tooth 26. Plates 16 and 17 are again rigidly locked together by means of rollers 25 and slot 24 and teeth 26 and 34, and plate 17 is carried backward by the movement of plate 16.

Attached to plate 16 is a spring 36 anchored to the side frame of the machine. The purpose of this spring is to return the parts to their original or normal positions in case the operator lets go of the handle while on its return or does not push it back far enough. Spring 36 is so proportioned that it will bring the parts back to their original position in such a case. As the parts reach their original postions pawl 32 again locks with pin 31 locking plate 17 and its connections in their original positions and extension 28 on pawl 27 contacts with pin 30 lifting tooth 34 out of engagement with tooth 26 preparing the parts for the next operation of the machine.

The reversely acting gears facing in opposite directions and operating upon different sides of the gear wheel 23 when successively in engagement with it, rotate that gear and with it the main driving shaft always in the same direction. The arrangement of these gears 21 and 22 at different distances from the center of the rock shaft enables the main driving shaft to be rotated a greater distance when the handle 2 is moved in one direction than in the other. As shown in the machine these parts are so proportioned that on the forward or initial movement of handle 2 shaft 14 is rotated two-thirds of a complete revolution and one-third of a revolution on the return of handle 2 to its original position. One advantage of this arrangement is that practically the entire work of adding is performed on the forward pull of the handle 2. In the machine shown no work is performed on the return of the handle except to return to their original positions a few of the parts of the machine, and to remove the record card from the machine. In practice it has been found that the ordinary operator will not push a reciprocating handle backward at least to its full limit, or with the force with which he will pull it forward and that most operators will let the handle go at some point during the return. For these reasons a return spring is important in practical use. This arrangement, moreover, enables the machine to be made very rapid, accurate and positive in operation.

In order that gear 21 may pass in front of gear wheel 35, gear wheel 23 is made of double width so that gears 21 and 22 mesh with the front half of it while gear 35 meshes with its rear half as shown in Fig. 3.

*Keyboard mechanism.*—This is specially illustrated in Figs. 1, 2, 25, 26, and 27. The keyboard consists, as shown, of a bank of keys 1, 1 consisting of five series each having nine keys, for the item recording and adding part, and two series, each having nine keys, for the characters identifying part.

As shown, the keys are of the usual typewriter kind adapted to be operated by being depressed by the fingers, but it will, of course, be understood that any suitable devices of any desired form and construction can be used as keys, and are included under that term as employed in the specification and claims.

The keys 1 are mounted in grooves in a casing 37 having one casing for each series of keys which casing and its series of keys and connections form one of the keyboard units. The casings 37 are mounted on rods 38, 38 which pass through openings 39, 39 of the casings. The shaft of each key extends to and is flush with a portion of the casing 37 which is concentric with main driving shaft 14. Each key has a spring 40 to hold it in its upper position and which carries a roller 41, which being in contact with the surface 42 of the casing 37, acts as an operative stop to hold the key in position. The shanks of the keys are held in their slots by the bars 43 to which springs 40 are secured. The back of each key section casing 37 is recessed at 4 in order to give room for the bar 43 of the next section or unit. Running behind the keys and in contact with the rollers 41 of the key shanks is the universal bar 45 mounted upon links 46 and 47 pivoted at the keyboard casing at 48. This universal bar 45 is normally held in its upper position by means of a spring 49 attached to the bar and to the frame. Bar 45 carries a series of pins 50, one for each key shank, each pin being capable of engaging with one or the other of two notches 51, 52 in the key shank according to the vertical position of the key shank. Link 47 has a tooth 53 which coacts with pawl 54 mounted on the casing 37. 55 is the preliminary or zero stop and is controlled by an arm 56 which is operated by a pin 57 on universal bar 45.

The operation of the parts is as follows: When any key of a series is depressed the roller 41 forces the universal bar 45 of that series downward. As this bar is mounted on two parallel links the whole bar swings downwardly but always maintains a position parallel to its original one. This causes pins 50 to enter notches 52 in the shank of all the keys except that of the key which has been depressed. In the case of that key its pin 50 enters notch 51. The keys are all thus locked in position, the depressed key in its down position, the other keys in their upward position. Pawl 54 engages with tooth 53 of link 47 and holds bar 45 in its downward position. The swinging movement of universal bar 45 to the right rocks the arm 56 and lifts the preliminary stop 55 out of its operative position, or in other words, brings it flush with the lower concentric surfaces of casing 37. The toe of the key that has been depressed projects downwardly beyond its concentric portion and acts as a stop; in the manner presently to be described, of the mechanism for rotating one of the type sectors 4. Preliminary stops 55 in their normal position prevent the movement of the type sectors should handle 2 be operated before any keys are depressed. Each pawl 54 is provided with a tail 58 for unlocking the universal bar and permitting the parts to return to their normal position. This operation automatically by the machine will be presently described. It will be noted that the shank of number nine key does not project down to the concentric portion of casing 37. The stop operated part for this key is a stationary plate 59 secured to the casing 37. Otherwise key 9 is like the other keys.

In our improved keyboard mechanism a single universal bar operates directly to lock the keys in their down or up position, and to unlock them and to control directly the operations of the preliminary or zero stop. The locking and unlocking of the keys by the universal bar are accomplished by means of a single engaging portion on one of these parts and two engaging portions on the other. In the form shown the one engaging part is the pin 50 on the universal bar 45, while the two engaging portions on the keys are the notches 51, 52. This enables the same devices to lock and unlock all of the keys both those that are down and those that are up. The construction of the keyboard sections of the item part and those of the character identifying part are identical in construction.

*The setting mechanism for the type sectors.*—This is more particularly illustrated in Figs. 3, 4, 5, 6, 7, 25, 28 and 32. The object of the setting mechanism is to transmit motion from the main driving shaft 14 to the numeral bearing devices, the type sectors 4 and from them to the adding wheels and to return these parts to their normal positions. Separate setting devices are provided for each series of keys and the movement of each set is controlled by the keys of the series. Each key when depressed throws a stop into the path of its setting device which stop limits the movement of the setting device in accordance with the value of the key depressed. The setting devices for the type sectors of the item mechanism and those for the character identifying type sectors are of the same construction.

As the movement of the type sectors and their connecting parts is a reciprocating movement and that of shaft 14 a continuous rotary movement, each setting device is provided with a part fast on the shaft and a part loose upon it, and a locking piece is provided to normally lock the fast and loose parts together but each lock is thrown out of operative position when it engages a key stop. This throws the loose part from the fast part, the former being locked in the position to which it has been moved. With the loose part are connected the corresponding type sectors and connecting parts. The main driving shaft continues its rotation and in the course of the operation of the machine the loose parts are unlocked and returned to their original positions. In the form of these devices shown in the drawings there are loosely mounted on shaft 14 a series of bell crank levers 60. At one end of each of these levers is mounted a locking dog 61 which has projecting lug 62. Lug 62 has a rectangular projection, shown in Fig. 3, adapted to coact with a surface 63 of a lever 64 fast on shaft 14. The other end 65 of lever 64 forms a counterbalance portion. In the lever 64 is a slot 66. 67 is a spring secured to a vertically extending portion 68 of dog 61 and normally holds the dog in the position shown in Fig. 6 with surfaces 62 and 63 in contact. Portion 68 has a projection 69 extending at right angles to it adapted to be engaged with notches 70 of a locking plate 71 secured to casing 37. 72 is a stop pin for limiting the movement of dog 61. When 14 is rotated lever 64 forms contact with surfaces 63 and 62 pushes bell-crank lever 60, to which locking dog 61 is secured, ahead with it, thus rotating bell-crank lever 60. This movement of the latter continues until the nose of locking dog 61 engages either the preliminary or zero stop 55 or lower end of the shank of any key that has been depressed, which shank in that case acts as a stop. This contact slightly rotates dog 61 on its pivot, moves pawl 62 away from contact with surface 63 of lever 64 and brings it opposite slot 66 in lever 64, permitting lever 64 to continue its rotation with shaft 14 but preventing higher rotation of bell-crank lever 60. The slight rotation of dog 61 also throws rectangular portion 69 into one of the notches 70 of locking plate 71 thus positively locking bell-crank lever 60 and its connections in a fixed or rigid position.

The means shown for returning the levers 60 to their original position consists of the following: Attached to each bell-crank lever 60 is a link 73 pivoted to a plate 74 having a downwardly projecting tooth 75. Plate 74 is loosely mounted on shaft 76. Fixedly mounted on shaft 76 are two arms 77 carrying a universal bar 78 adapted to coact with the teeth 75 of the different plates 74. On the outside of the machine (see Fig. 7) mounted on main shaft 14 is a cam 79 which acts on the cam roller 80 of a bell-crank lever 81 pivoted at 82 to the frame work, the roller 80 being held against the cam by means of spring 83. Attached to this bell-crank lever 81 is a lever 85 fixed to shaft 76. These parts stand normally in the position shown in Fig. 7. Immediately upon the beginning of rotation of shaft 14 (in the direction of the arrow in Fig. 7), roller 80 will drop down to cam surface 79 carrying universal bar 78 away from teeth 75 thus leaving bell-crank lever 60 in a position free to rotate. Later on in the rotation of shaft 14 cam 79 will begin gradually to move roller 80 upward and thus gradually to swing universal bar 78 slowly to the right as viewed in Fig. 6. During this movement it will collect the teeth 75 and move them gradually to the right to their original positions, as shown in Fig. 6, thus returning bell-crank levers 60 to their original positions. By this time the levers 64 fast on shaft 14 have completed one revolution and the parts will occupy the positions shown in Figs. 6 and 7 ready for the next operation.

*The type sectors and connecting parts.*—These are specially illustrated in Figs. 6, 11, 12, 28 and 32. Each type sector 4 is connected to one of the rock levers 60 through a link 86 pivotally connected with the arm 87 which forms a portion of the type sectors. We will first describe the type sectors of the item adding portion of the machine. These type sectors may be made of any suitable form. As shown they are made with a body 88 forming a part of a cylinder and a sector 89 carrying type 5 and ratchet teeth 90 and a sector 91 having gearing 8 meshing with intermediate adding wheels 9 as already described.

The type sectors of the identifying character portion are of the same construction, but they do not have any gear teeth 8 as they are not connected to the totalizing mechanism and serve only to print the identifying number on the item list.

The different type sectors are arranged with their cylindrical portions nested together in the well known manner. By this arrangement the arms 87 can be brought opposite the different bell-crank levers 60 while the type sectors can be arranged close together so as to be capable of printing a column of figures of the character shown in Fig. 36. The type sectors are preferably arranged so that the zero type will normally be slightly off the printing line, as shown, slightly in advance of that line and the sector will then be moved to bring the zero to the printing line and will then be moved to bring upon the printing line the type represented by the key depressed. We also mount the type sectors movably so that they can be swung in a curved path to mesh with the adding wheels. In the form shown in the drawings the type sectors 4 are mounted on the main shaft 92 which shaft is carried by arms 93, 93 pinioned to a rock shaft 94. To the rear of main driving shaft 14 is a cam shaft 95, which is driven by main driving shaft 14 through gear 96 on the latter shaft (see Fig. 7) through intermediate gear 97 and gear 98 on shaft 95 so that the latter shaft rotates in the same direction and in unison with driving shaft 14. Mounted on shaft 95 is a race cam 99 in which runs a cam roller 100 mounted on arm 101 rigidly secured to rock shaft 94. Cam 99 consists of an upraised portion 102 and a long portion 103. Coacting with ratchet 90 are a series of pawls 104 pivoted on a stud 105 and having a downwardly extending portion 106 which normally rests against a key or feather 107 mortised into a shaft 108.

The operation of the adding parts is as follows: When the machine is at rest the parts occupy the position shown in Fig. 6. On the first start of the machine shaft 108 is rotated slightly, by means to be hereinafter described, so as to free the depending portions 106 of the pawls permitting the pawls 104 to drop into engagement with the ratchet teeth 90. Just before this happens portion 102 of race cam 99 raises roller 100 rocking shaft 94 and rocking arms 93. This rocking movement is sufficient to carry shaft 92 and the individual sectors slightly to the right, as viewed in Fig. 6, so that the zero or first numeral on each type sector will be upon the printing line or in line with the hammers. When this position is reached the pawls 104 drop into the first tooth of ratchet 90 holding the type sectors momentarily in this position of alinement. A further movement of the main driving shaft moves the rock levers 60 until they are stopped either by the preliminary stops 55 or the depressed shanks of the keys. This movement of the rock levers 60 is communicated to the type sectors which type sectors are moved the distance corresponding to the value of the key that has been depressed in its series bringing the proper type upon the printing line. Fig. 32 illustrates the position of the parts taken in such operation when the 8 key has been depressed and the main driving shaft has been rotated far enough to bring dog 61 of its series into engagement with the depressed shank of key 8. This swinging movement of the type sectors to the right and slightly downward enables the teeth of gear 8 to mesh with the gear teeth of wheel 9 always with certainty and accuracy and without any binding of the teeth. This is assisted by commencing the upward rotation of the type sector just at or slightly before the intermeshing of the two gears. The movement of gear teeth at that moment is a combined one and more effectually insures against any binding of the teeth of the two gears.

The movement and action of the character identifying type sectors are the same as those of the item type sectors. As the character identifying sectors have no gear teeth 8 they do not communicate motion to the totalizing wheels. They move to the position set up on the keyboard and print in that position.

*Adding mechanism.*—This is more particularly illustrated in Figs. 5 to 8, 19, 20, 21, 22, 31 and 32.

The intermediate adding wheels 9 are loosely mounted on a shaft 109 mounted in the sub-side frames 110 and 111 of the machine and are restrained by pawls 318 secured to the framework. Each wheel 9 is provided with forty teeth and each gear 10 with which it meshes is provided with twenty teeth.

Below the adding wheels 9 are a set of carrying wheels 112 loosely mounted on the shaft 113, supported in the sub-side frame. Each carrying wheel 112 has thirty teeth and is provided with three carrying pins 114, spaced one hundred and twenty degrees apart. These coact with the carrying set-up levers which levers carry the carrying pawls 116. Each set-up lever 115 has a rearwardly extending portion 117 which coacts with locking levers 118. Set-up levers 115 are loosely mounted on a stud 119 and locking levers 118 are loosely mounted on stud 120. Carrying pawls 116 are loosely pivoted to a downwardly extending portion 121 of set-up levers 115 and are normally held with the left hand portion upward through the spring 122. Carrying pawls 116 have a rear portion provided with a right angled portion 123 which are adapted at all times to coact with one of a series of pins 124 mounted in a helix fast on circular plates 125 secured to shaft 126. 127 is a plate mounted on rock shaft 128, there being one of these plates for each carrying wheel. Each plate 127 has a carrying rack 139 mounted upon its plate by means of studs 130, 130 secured to plate 127 passing through slots 131 in the carrying rack, each rack being held normally in its upward position by means of a spring 132 secured to the plate and rack. Carrying rack 139 is provided at its upper end with teeth 133 which at times mesh with the teeth of carrying wheels 112. Rack 139 is provided with a lip 134 with which the toe of its corresponding carrying pawl 116 is at times adapted to engage. Mounted on a rock shaft 135 are two arms 136 which carry a universal bar 137, which on rotation of rock shaft 135 comes against the upper surface 138 of locking levers 118. Upon shaft 120 are mounted two plates 139 which extend downwardly and at their lower ends 140 are grooved to conform to the surface of the disks 125. Extending between the two plates 139 is a fixed stud 141 which coacts at times with a rearwardly extending arm 142 of lock levers 118. A spring 143 normally holds lock levers 118 in the position shown in Fig. 6. A spring 144 normally holds each set-up lever 115 in the position shown in Fig. 6.

The operation of the adding and carrying mechanism is as follows: The movement of gear 8 is imparted through intermediate adding wheels 9 and gear 10 to total adding wheels 7 adding on each operation of the machine to the total already standing upon these wheels the number that is set up on the printing line. The intermediate adding wheels 9 also rotate the carrying wheels 112 a similar number of teeth. As soon as this addition takes place cam roller 100 runs off the high portion of cam 102 and the type sectors are moved out of engagement with adding wheels 9. When carrying wheel 112 has been moved nine units one of the pins 114 is immediately next and to the left of the toe of set-up lever 115. Upon the next movement of wheel 112 pin 114 will rotate lever 115 slightly to the right. This rotation will move the right angled portion 145 on the right end of lever 115 from the position it occupies in Fig. 19, which is the normal position, into the position shown in Fig. 20. In the former position the right angled portion 145 lay against surface 146 of lock lever 118 but in the position to which it is moved it lies against the surface 147 slightly cut away thus locking lever 115 in its retracted position. 148 is a lip on lock lever 118 to prevent lever 115 from overthrowing. The parts of our improved machine operate so rapidly that the momentum of levers 115 would be apt to throw the end 147 over the lower part of lever 118 if it were not for this lip 148. Should such an over-throwing occur it would block the machine and render it inoperative. Lip 148 also aids in the return movement of the parts to insure the quick return of lever 115 to its original position. If desired lip 148 can be continued upward still farther or be joined with the projecting portion of lock lever 118 lying just above it so that there will be no opening upon which the right hand end of 115 can possibly be thrown. The position of lever 115 and its connecting parts immediately after the above carrying operation is shown in Fig. 32. The rotation of set-up lever 115 moves the carrying pawl 116 to the left and upward bringing its toe over lip 134 of carrying rack 139 and also bringing the right angled projection 123 into line with the pins 124 of the helix. Immediately after this has taken place a cam 149 (see Fig. 5) on cam shaft 95 acts on the cam roller by a lever 150 which is fast on shaft 128 and rocks this sufficiently to throw plates 127 and carrying racks 139 to the right bringing teeth 133 into mesh with the wheels 112. This brings lip 134 under the left hand end of pawl 116. It will be understood that this lip 134 extends laterally so that the pawl 116 with which it engages will be the pawl of the next lower numerical order.

The adding helix in the continued operation of the machine is rotated so that the pins 124 will engage with right angled portions 123 of such of the pawls 116 as have been moved in the position shown in Fig. 38. This will rotate pawl 116 on its pivot and through lip 134 will force rack 139 downward moving carrying wheel 112 of the next higher order one unit. Where, however, a pawl 116 has not been thus set but is in its normal position, shown in Fig. 19, the pin of this spiral will pass inside of the projection 123 and will not affect pawl 116 in any way.

The carrying helices are rotated by means of the following devices: Mounted upon cam shaft 95 (Fig. 7) is a cam 151 which acts on the cam roller 152 mounted upon lever 153 pivoted to the frame work at 154. Pivoted to lever 153 is a link 155 pivoted at its other end to an arm 156 mounted upon rock shaft 157. A spring 158 normally holds arm 156 in its rearward position. Referring now to Fig. 8 it will be seen that shaft 157 which extends inwardly and has an inner end mounted in the side frame 110, carries a sector 159 which in turn meshes with a pinion 160 secured to adding helix shaft 126. Shaft 126 is thus rotated through an arc sufficient to cause adding spiral pins 124 to pass successively by their corresponding carrying pawls. 161 is a binding pin which fastens or holds adding spiral plates together. At the last moment of rotation just before cam 151 has ceased to act this binding pin comes into contact with the end 162 of plates 139. This moves plates 139 to the rear sufficiently to lift bar 141 against portions 142 of the locking levers 118 rocking those levers to the left so as to unlock the carrying levers 115. This returns the various parts of the operation of the mechanism to their normal and original positions. The pins 124 of the spiral on their return movement pass by projections 123 without touching them.

In order to insure the accurate return of the carrying plates to their normal or original positions in case the springs do not operate properly, we preferably employ means for positively returning them to such position. The devices shown for this purpose are as follows: 440 is a bar extending under the entire set of carrying racks. It is supported on an arm 441 pivoted at 442 and carrying at its other end a cam roller 443 operated by a cam 444 on cam shaft 95. Away at the end of the operation of the machine this cam positively pushes up the racks to release them instantaneously upon the starting of the machine.

*Printing mechanism.*—This is specially illustrated in Figs. 1, 2, 4, 5, 6, 10 and 23.

Mounted on the top plate of the machine are sliding rods 203, 203 (Fig. 2) fixed in bosses upon which rods the carriage 12 is mounted. This carriage has two sliding plates 205 adapted to slide upon rods 203 upon which is hinged the housing of the hammer mechanism. These two plates are attached at the forward end by rods 206 which pass through links 207 and are held in position by screws 208. At both the right and left of the machine and hinged to the plates 205 are side housings 209 which include the part of the hammer operating mechanism which goes into contact with the hammer trips as will be explained hereinafter.

In the forward part of the carriage is mounted a shaft 210 carrying the main feed roller 211. On this shaft but inside of the right hand side housing is a spur gear 212 and a ratchet wheel 213. In the right hand housing above shaft 210 is a short shaft 214 (Fig. 4) carrying a gear 215 meshing with gear 212. Shaft 214 has upon its upper or right-hand end outside of the casing a knurled wheel 216 (Figs. 1 and 2).

Referring now to Fig. 6, mounted in the arms 217 pivoted at 218 and between the side housings is another feed roll 219. This roll is held normally in contact with main feed roll 211 by means of spring 220. The forward end of arms 217 rest upon a rock shaft 221 which extends between and through the two housings and has upon its right-hand end outside of the casing a thumb piece 222 (Figs. 1 and 2); coacting with the forward end of arms 217 and in shaft 221 is a pin 223 extending outward from both sides of shaft 221. At the rear of the carriage underneath the hinged rod 224 is a roller 225 which is held up into position against the hinged rod 224 by means of a spring 226 mounted on a block 227 adapted to hinge rod 224.

Referring to Fig. 23 it will be seen that on one side of each of the blocks 227 is a coiled spring 228 encircling rod 224 secured at one end to block 227 and passing at its other end under one of the side housings at the point 229. These springs exert an upward pressure upon the carriage and when permitted will raise the forward end of the carriage into the position shown in Fig. 5.

Mounted on the inside of each of the right and left hand housings at the forward end is a small pawl 230 (Fig. 6) which pawl is pivotally mounted on the carriage at 231 and held in normal locking position by the spring 232. The lower end of pawl 230 engages a pin 233 fixed to the stationary bar 206. The upper end of pawl 230 coacts with the other end of pin 223 which projects to the left through bar 221 and has a portion 234 for limiting the rotation of rock shaft 221. Mounted between the two side housings is an intermediate paper guide roll 235 which is idle and serves merely to hold the paper down against the type plate. It will be noted that if the knurled wheel 216 be turned, the lower feed roll will be driven by the gearing 214 and 212 in either direction; also that the pressure in one direction on the thumb piece 222 will serve to separate the feed rolls by releasing roll 219 so as to permit the paper to be passed through between them, whereas motion of the thumb piece in the other direction will cause pin 223 to act on the cam locked surface of pawl 230 forcing it forward and releasing the pawl from engagement with pin 233, whereupon the springs 228 will cause the carriage to rise into the position shown in Fig. 5. On restoring the carriage to its normal position pawl 230 will act as a lock and hold it in its downward position.

Mounted upon the inside of the right-hand housing is a pawl carrying plate 236 pivoted at 237 in the frame work of the carriage. This plate carries a pawl 238 on its forward end which acts upon ratchet wheel 213 to rotate shaft 210 and feed forward the paper. The rear end of plate 236 has two parts, one a downwardly projecting portion 239, which portion has its lower surface flush with the lower surface of the carriage, and a portion 240 which has two cam surfaces 241 capable of coacting with pin 242 affixed to the type plate. Pivoted to the right-hand main side frame of the machine at the point 243 is an operating plate 244 which extends through an opening of the side frame and then upwardly until it is flush with the type surface at the point 245 where it is directly in line with the downwardly extending portion 239 of the plate 236. At the lower end of the operating plate 244 and pivoted at 246 is a connecting link 247 extending downwardly and attached to an arm 248 bearing a cam roller 249 bearing against a cam 250 mounted upon the main cam shaft 95. It will be seen that when cam 250 comes into operative position it will raise the arm 248 and link 247 and will push up the surface 245 into contact with surface 239 thus rocking plate 236 upon its pivot and causing pawl 238 to move in a downward direction and through gear 212 to rotate shaft 210 and the main feed roll 211 thus feeding forward the predetermined amount of paper. This feed takes place at the very beginning of the operation of the machine and is practically the first thing that happens. Normally the paper used is a short paper and is pushed through the guide rolls at the rear of the carriage and underneath the free roll 235 under the hammers, around the lower feed roll and up in between the two rolls as shown by the dotted lines in Fig. 6. If desired the paper may be passed after going from the feed rolls underneath a shoulder piece of metal 251 which may be used as a stationary knife in order to tear off the amount of paper needed.

If preferred a roller of paper may be used and in Figs. 1 and 2 a roll 252 is shown mounted in brackets 487. From the roll the paper passes through the machine as already described.

Preferably we use individual hammers for the different type sectors. These are shown in Fig. 23. In the machine shown in the drawings nine hammers are required. The first right-hand hammer 6, as viewed in Fig. 23, is for the detector device; the next two hammers to the left, as viewed in Fig. 23, being for the cents and these are preferably secured together and operated as one. The two extreme left-hand hammers shown in Fig. 23 are for the character identifying columns.

The hammers are operated through the main driving mechanism of the machine by means of trips, these trips engaging with projecting portions of toes connected with the hammers. In our preferred form the trips of all of the hammers are always operative but only those trips engage with the hammer toes which are moved into operative position through the operation of a key of the corresponding series of keys. We will now proceed to describe this mechanism.

Situated inside the right-hand housing of the carriage are the five lower projecting portions or toes connected with the hammers and in the left-hand housing the three upper hammer toes. The cents are always printed together and the two cents hammers are therefore operated together and mounted in a common operating block 254. This operating block together with the other operating blocks to which the hammer handles are secured is pivotally mounted upon stationary shaft 255, which shaft extends across the machine through the side housing, being held in position by screws 256.

Each hammer and hammer block is arranged with a projection or toe 257 adapted to be tipped to operate the hammer in a manner presently to be described. These toes form the lower part of rocking piece 258, each loosely mounted on shaft 255 and each mounted to its hammer block by a cross-over rod 259. Five of these toes 257 are arranged in the right-hand housing and three in the left as shown in Fig. 23. The cross-over rods are arranged as shown, in that figure, the identifying one connecting with the piece 258 at the left in the right-hand housing, the cents one connecting with the next piece 258, the dollar with the next piece 258 to the right and so on, the cross-over rod 259 of the highest identifying column communicating with the right-hand piece 258 in the left-hand housing, the block 254 of the lower identifying column with the next to the left and the outer one with the highest numeral hammer block 254.

These cross-over rods are for convenience arranged in a spiral manner as shown in Fig. 6. Each piece 258 has a spring 260 for holding it in normal position, the springs being attached to a spring bar 261 (Fig. 4). This spring bar consists of a small frame 262 mounted upon a shaft 263 which shaft extends across through the housing. It will be understood that there are two such spring bars on each side of the machine. Each spring bar has connected with it a handle 264 to move the spring bar into various positions. 265 are notches in the covering 266 of the carriage (Fig. 2). These notches are made by cutting an opening 267 in the top covering leaving the prongs 268. These cuts form a resting plate for handle 264. Any number of notches may be provided. By varying the position of the handle 264 in the notches the tension of the springs 260 can be regulated.

The hammer toes 257 project downward to a point nearly flush with the depressed surface of the top plate as shown in Fig. 4. In an opening 269 in the top plate project upward a series of trips 267 projecting upward from sliding trip plates 271. These trip plates and the trips are adapted to have a reciprocating forward and backward movement. Each trip plate is mounted upon a tilting plate 272 pivotally mounted upon a stud 273 secured to the side frames. Each plate has a cam slot 274 at its forward end in which rides a pin 275 secured to a plate 276 pivoted on a stud 277. Each tilting plate 272 has slots 278 in which work pins 279 secured to trip plate 271 allowing a sliding motion of the trip plate upon the tilting plate. The lower part of trip plate 271 is bifurcated to allow the head 280 of operating lever 281 to rise between the two projecting parts of the trip plate to give a forward and backward movement to the trip plate. Lever 281 is pivoted on a small shaft 282 which on the side of the side frame has mounted on it an operating arm 283. Connected to arm 283 is a link 284 pivoted at the bottom to a lever 285, the lever being provided with a cam roller 286 bearing against a cam 287. It will be seen that the action of cam 287 when it becomes operative is to depress lever 285 and through the above connections rock lever 281 to the left to move trip plate 271 in a horizontal direction along its slots.

In the normal operation of these parts all of the trip plates 271 are reciprocated forward and backward at every operation of the machine. It will be noted that normally, that is, when no key of the corresponding series has been depressed, trip 271 of the trip plate is too low down to engage with its corresponding toe 257. If a key in the series, however, is depressed it will operate to rock set plate 276 to the left or forward and will tilt the rear end of tilting plate 272 upward raising toe 267 of trip 271 high enough to engage with its corresponding toe 257. In this position of the parts the forward travel of trip plate 271 and trip 267 will force toe 257 to the left rocking plate 258 and through each cross-over rod raising the hammer upward. When trip 267 passes toe 257 the hammer will be brought down to deliver the printing blow. The handle of each hammer is preferably pivoted at 288. Secured to projecting portions of each is a compressed spring 289 which normally holds the hammer upward in the position shown in Fig. 6. The object of this is to provide for the rebound.

Fig. 33 illustrates the position of the hammer and its toe and the trip plate and tilting plate in the act of printing. The full lines represent the position of the parts immediately before contact is made between the trip and the toe, and the dotted lines the position of the parts at the moment when the trip is about to snap under from the toe. The operating head 280 of lever 281 is wide and extends through the entire set of trip plates.

The means by which the depressed key rocks setting plate 276 to the left will now be described as embodied in the form shown in the drawings. These are particularly illustrated in Figs. 3, 4, 6, 11 and 25. Each setting plate 276 is held by a spring 290 normally locked to the rear as shown in Fig. 4. On reference to Fig. 6 it will be noted that each arm 87 carries a sidewardly extending roller 291. Each of these rollers coacts with an extension 292 connected with a plate 293 pivotally supported on a fixed stud 294. Each plate 293 is arranged alongside of its corresponding arm 87. Each plate 293 is connected with its corresponding setting plate 276 by means of a cross-over rod 295 in the same manner as the hammer blocks are connected to the plates 258 and the cross-overs are arranged spirally in the same manner and for the same purpose. Fig. 24 gives a rear view of the cross-over rods. 296 are pins projecting each from the face of one of the setting plates 276 across the face of the plate of the next lower numerical order. The object of this is so that the movement of the setting plate of a higher order will move all of the setting plates of lower orders in the operative position so that the depressing of a key of any order will not only cause its own hammer to be operated but the hammers of all lower orders also to be operated. The two setting plates 276 at the right of Fig. 24 operate the hammers of the identifying column and the pin 296 of the higher column controls the action of the plate of the lower column. Each extension 292 has a cut away or depressed portion 298 (Fig. 6).

The operation of the above parts is as follows: At the time that the pawls 104 have dropped into the first notch of the ratchets 90 of type sectors 4, each roller 291 has swung the corresponding extension 292 slightly to the right and has entered the cut away portion or depression 298. If a key of the corresponding series has been depressed the arm 87 rocks still farther and in that case its pin 291 moves extension 292 slightly to the right and moves down the curved outer surface 299 on extension 292. Extension 292 and its outward curve 299 are so arranged that in this position of the parts the further downward and rearward movement of the roller 291 will follow the line of the curve 299 that curve now being concentric with shaft 92 so that no further movement will be imparted to plates 293 and their corresponding setting plates 276. Such further contact with roller 291 with extension 292 simply serves to hold plates 276 in their set position. But the rearward movement of extension 292 imparted to it when roller 291 passes out from cut away portion 298 upon surfaces 299 is sufficient to rotate plates 293 and setting plate 276 enough to tilt plates 272 as above described. In this manner the depression of a key in any series sets its trip 267 into operative position ready for the actuation of its printing hammer upon the operaton of the main operating handle and it also sets the trips of all hammers of lower numerical orders, of both the character identifying number section and the item adding section.

Immediately in the rear of the front hammer trips are a set of hammer trips for actuating the hammers to print the total on the adding wheels. For convenience these trips will be spoken of as the total hammer trips. There is, of course, one of these total hammer trips 300 for each wheel 7 of the adding series. In the form of machine shown in the drawings where there are only five type sectors, only five trips 267 are required, but one extra adding wheel is used and accordingly one extra hammer trip 300 is required, or in other words, six trips, for the adding part. As an identifying number is not printed when a total is taken, there are no total hammer trips 300 for this purpose.

Each hammer trip 300 is pivoted at 301 to a tilting plate 304 and is provided with a spring 302 to hold it against the stop 303 on the plate 304. The plates 304 are pivoted to a stud 305 secured to the frame work, and provided with a slot 306 in which runs a pin 307 attached to a setting-up plate 308 pivoted at 309 with a stud secured to the frame work. Each total trip is slightly depressed below the printing level exactly like trip 267 and projects upward into an opening 310 in the top plate at the rear of the machine. A rocking forward motion of plate 308 will raise trip 300 into operative position ready to engage its corresponding toe 257 and cause the operation of its hammer when the carriage is pushed backward to the rear of the machine. A total can be taken at any time by pressing the carriage backward along the side rods 203. The purpose of the two cam parts 241 of the plate 236 is to make one of the surfaces 241 of the plate 236 ride up on stationary pin 242 affixed to the type plate, and the purpose of the other surface 241 to ride up on the same pin 242 on the forward motion of the carriage so that on both the rear and forward movement of the carriage the paper will be fed and a space left above and below the total as printed on the paper. Preferably the total is printed in a colored ink to distinguish it from the different items.

The spaces above and below the total are illustrated in Fig. 36. Plates 308 are set up, as shown in the drawings, by means of the following devices: Mounted upon a shaft 311 near the middle of the machine are a series of bell-crank levers 312. Pivoted to each is a link 313, which in turn is pivotally attached to a plate 314. Each plate 314 has a cross-over rod 315 connecting it with corresponding setting-up plate 308. These cross-over rods are arranged spirally in the same manner as the cross-over rods of the set up plates 276. A rear view of these cross-overs will be found in Fig. 10. One arm of the bell-crank lever 312 has a nose 316. These parts are frictionally held and will set in whatever position they are moved to. The nose 316 is adapted to coact with pins 173 of adding wheels 9. When wheels 9 are at their zero position one pin 173 is immediately above and in contact with nose 316. The first movement of the adding wheels 9 from zero to one causes the pin 173 to rock nose 316 of lever 312 slightly to the right (Fig. 6). This movement is sufficient to rock set-up plate 308 sufficiently to the left (Fig. 4) to raise trip 300 into operative position. The positions of pins 173 on wheels 9, as shown in Fig. 6, is not the zero position but represents some position to which the wheels have been moved after amounts have been added on the machine.

It will be seen from the above that the initial movement from zero to one of any of the adding wheels 9 will set its corresponding hammer trip where it will remain in such position until the adding wheels are reset at zero. These trips and their connecting parts are returned to normal position, when the resetting handle is turned, by means of a universal bar 175 mounted on two arms 319 fast on shaft 168 striking against the lower end of bell-crank lever 312 moving toes 316 back into operative position and restoring all of the connecting mechanism to their original positions.

*Punches and punch selectors.*— These are specially illustrated in Figs. 6, 8, 9, 14, and 32.

Each type sector 4 of both item adding sectors and character identifying sectors has attached to it a connecting link 331 pivoted to the type sector by a stud 330, and having its other end pivoted to the rock lever 332 loosely mounted on the shaft 333. The other end of rock lever 332 has pivotally connected to it by stud 334 the punch selector 335.

The punch selectors are controlled in their differential or selecting movement by the type sectors, the punch selector moving downward to the corresponding position taken by the type sector controlled by the set up on the keyboard when the machine is operated.

In order to keep the punch selectors in proper alinement with the punches, each punch selector is bent over at right angles at the top and through the hole in the top passes a vertical rod 336. The rods 336 of both groups of punch selectors 335 are fastened tightly in the bent metal piece 337 as shown in Fig. 6, and which is supported on side arms 356 loosely mounted on shaft 357.

The means for operating the punch selectors is as follows: The side arms 356 with operating cross plate 337 form a rigid structure loosely mounted on shaft 357, and the rear projections of the punch selectors abut against the operating plate 337, and the operating plate is held in a rearward position by the spring 352 attached to the side frames of the machine. Operating plate 337 is given a forward and backward movement by the operation of the machine, as will be presently described, and this forces the punch selectors forward so that the nose of each selector strikes its appropriate punch 352 and forces it through the card which has been fed into punching position by the card feeding mechanism which will be presently described.

To force the plate 337 to the right as viewed in Fig. 6, we preferably employ a toggle lever arrangement, of which 343 is one part and 341 the other. Part 343 consists of two arms, each pivoted at 338 to each of the upright levers 356. Part 341 consists of two arms freely pivoted on shaft 340 and at their other ends pivoted at 339 to the arms 343. This whole arrangement constitutes a toggle frame for forcing plate 337 forward. The toggle is operated through link 344 secured at 345 to part 343. Link 344 is secured at its lower end to arm 346 fast on shaft 347. Levers 350, one for each row of punches, are operated in unison with plate 337 by means of a link 351 pivoted to a cross bar extending between arms 356 and having its other end pivoted to one of the levers 350 which are fast to shaft 347 loosely mounted in the side frames of the machine. The function of levers 350 is to press against collars 353 in the return movement and to return the punches to their original position.

Fast on rock shaft 347 is an arm 466 having at its outer end a cam roller 348 which coacts with a cam 349 mounted on shaft 470 which makes one revolution for each operation of the machine as will be presently described. The punches, ten for each series, are mounted in plates 354 and 355. Plate 355 extends across the machine and is mounted on the side frames. Brackets 540 fastened to plate 355 support plate 354 and form the punch support. Fastened to plate 355 is die plate 539, (see Fig. 14) with which the punches 352 coact.

The holes of the die plate for the punches of the adding section are numbered 358 and those of the identifying number section are marked 360. The space between the plates is for the passage of the card.

These plates are cut away at certain portions so that rolls 526 and 528 may coact with the edges of the card when it is in punching position. The action of this part of the mechanism is as follows: When the type sectors 4 move to the position indicated by the set up of the key-board, the punch selectors move to a position opposite the corresponding punches. This movement we speak of as a differential or selective movement. At the proper time in the cycle of the machine, that is, when the card feeding mechanism has delivered a card to a position before the punches and the card rests on the stop fingers 481, the cam 349 acts on roller 348 and rocks shaft 347. Shaft 347 through the medium of arm 346 and link 344 operates the toggle arm and causes the operating plate 337 to force the punches 352 through the card. As the arms 356 are pulled forward the link 351 relieves the pressure of arm 350 on the collars of the punches so that the punches are free to move. In this way the card is perforated with holes corresponding to the data set up on the keyboard and on the type sector and printed by the latter on the record strip.

Fig. 9 shows a rear view of the die plate for the punches having the die holes 360 of the identifying columns and the holes 358 of the item columns. It will be noted that there are ten holes to each column, and that the punch selectors stand normally at zero. The zero punches will always act when nothing has been set up on that column, while the zeros of the type sections 4 are printed in the manner already described. In other words, one punch in each column always operates, the one punching the card being determined by the position of the punch selector of that column.

Fig. 34 illustrates the card 445 before use, and Fig. 35 illustrates it after the punching operation. Card 445 is provided with a printed set of numbers 447 appearing under the word "Amount" corresponding with the set of numbers represented by the keys of the item bank of keys, in this case representing dollars and cents, and also with a printed set of numbers 446 appearing under "No." corresponding with the set of numbers represented by the keys of the character identifying bank of keys.

Fig. 35 illustrates the card after the holes 449 and 450 have been punched in it, the former in the set of item numbers 447, and the latter in the set of identifying numbers 446. As there shown, the holes 449 represent in value $862.10, and the holes 450 represent the identifying character or number 30.

*Card feeding mechanism.*—Any desired number of record cards within the limits of the capacity of the feeding platform may be placed in the machine at the commencement of any series of operations, and after the cards are placed in position, the feeding of the cards, the punching of the data holes, and the removal of the card from the machine are controlled by the movement of the handle of the machine. Each time that the handle is moved, a card is automatically fed to the proper position, punched with the data set up on the keyboard of the machine and then removed from the machine by feed rolls. This mechanism is particularly illustrated in Figs. 1-9 and 14, and will now be described.

The card platform 516 is formed on the rear portion of the cover plate of the machine. The cross bar 471 connects upright side plates 515 formed on the top plate. An adjustable gage bar 480 extends across the frame of the machine behind the platform 516 and is adjustably carried by the screws 517 by which the distance between the edge of the platform 516 and the bar 480 may be accurately adjusted, so as to leave between them a feeding slot of the desired width to accommodate varying thicknesses of cards. A series of slats 473 are secured to the gage bar 480 and serve to support the card and prevent its buckling. Upon the guides 472 which are supported by the cross bar 471 and the gage bar 480 is mounted a vertically reciprocating cross-head 479 upon which is carried a plate 478 which projects beyond the face of the cross head a distance slightly less than the thickness of a card. A follower plate 361 is held against the cards by the weights 365—365 which are secured to the plate by the cords 362 passing over sheave wheels 363—363. The follower plate 361 exerts a constant pressure against the cards and holds them firmly against the gage bar 480 and the fingers 473, so that when the cross-head 479 descends the plate 478 will engage the top edge of the first card and carry it down through the opening in front of the gage bar 480.

The cross-head is actuated by means of the connecting rods 364—364, connected to the cross-head and to the spur gears 457. Motion is imparted to the latter in a way presently to be described. The feed rolls 468 and 518 extend across the machine just below the feeding slot, between the gage bar 480 and the platform 516. The rolls are provided with intermeshing gears 459 and pinions 458 on the roll 518 mesh with the gear 457, by which the rolls are driven. The roll 518 is journaled in the side frames of the machine, and the roll 468 is mounted on the ends of the pivoted arms 460, to the opposite ends of which are secured the springs 461, which hold the roll 468 in yielding contact with the roll 518, thus allowing for any variation in the thickness of the record card.

On each side of the machine, below the feeding rolls and adjacent to the punches, are mounted two stud rolls 526—528 which are driven at a higher speed than the feed rolls and which we term "accelerator rolls". The rolls 526 are journaled in the main side frames of the machine; but the rolls 528 are each mounted in a rock arm 530 carried by the shaft 524 upon which the spur gears 521 are mounted. The rock arms 530 are secured to the pivoted arms 522 by the links 527, and the other end of rock arm has attached to it a spring 531 having its end fastened to a pin on the side frame. Cam rollers 523 carried by the arms 522 are engaged by cams 529 on shaft 524. The rotation of shaft 524 will thus rock the arms 522 so as to carry the rolls 528 against and away from the rolls 526 at each revolution of the shaft 524, the parts being so proportioned and arranged that during the feeding of a card into punching position the rolls 528 will be held away from the card, but when the punching is completed, the rolls 528 which are positively driven by the pinions 525 which are in mesh with gears 521, will be carried into engagement with the edges of the card and will feed it down into the ejector rolls, to be presently described.

Each card is supported in position for punching by the fingers 481 carried by the reciprocating bar 484, and which are moved into position under the card before the card reaches its punching position, and which move out from under the card as soon as the action of the punches is completed. The bar 484 moves in guides mounted on the side frames of the machine. The bar 484 carries cam rollers 483 mounted on uprising portions 532. Cams 482 are mounted on shafts 533 which carry spur gears 455 for rotating them, so that the bar 484 and fingers 483 will be moved back and forth at each revolution of the gears.

The ejector rolls 546—547 are mounted on shafts 435 and 434. The shaft 535 is journaled in the side frames of the machine, and secured to the shaft are the pinions 462 which mesh with the gears 455. The shaft 534 is journaled in the arms 463 pivoted to the side frames of the machine, and to the lower ends of these arms are secured springs 464 whereby the rollers 546 are held toward the rollers 547 and exert a yielding pressure against the cards when they are fed between them. The rolls 547 are positively driven, preferably at a higher rate of speed than the accelerator-rolls, by the pinion 462 in mesh with gears 455, while the rolls 546 are frictionally driven.

Underneath the ejector rolls is a card chute 469 for guiding the cards out of the machine so that they may be gathered up by the operator. Drive pinion 458, spur gears 457, 456, 455, 521, drive pinion 525, drive pinion 462 and spur gear 454 are all in mesh and form duplicate trains of gears on the outside of the main frames of the machine. These trains of gearing are driven by the spur gears 453 which are mounted on shaft 470 which extends clear across the machine. The spur gears 453 mesh with gears 454 which are the lowermost gears of the portion of the machine just described. On the outer ends of shaft 470 are mounted crank disks 452. The outer ends of the main shaft 95 carry crank disks 451. Connecting these crank disks are pitmen 367 pivoted to 452 by stud 536 and to 451 by stud 286. The two pitmen are set at 90 degrees to one another and so form an efficient drive for the card feeding mechanism. Whenever the operator pulls the handle of the machine the main cam shaft makes one revolution, and so at each operation the card feed shaft 470 makes one revolution.

The operation of the card feed is as follows: The cards 445 are placed upon the platform 516 and the follower plate 361 is placed behind them. When the operator sets up an item amount with its identifying number on the keyboard and pulls the handle, the type sectors 4 and punch selectors 335 move to corresponding positions as before described. While the type sectors and punch selectors are moving to position, the crosshead 479 descends and the blade 478 will engage with the upper edges of the first card on the platform and will carry it downward until it is grasped by the rotating rolls 468—518, which will feed the card downward until it rests on the supporting fingers 481. The type sectors and punch selectors are now in position, and the card stationary and the punches are now actuated and punch data holes in the card corresponding to the data set up on the keyboard. As soon as the punches have returned to normal position the rolls 528 are swung toward the rolls 526, engaging the ends of the card. At the same time the supporting fingers 481 are withdrawn from under the card, which will be fed between the ejector rolls 546 and 547, and will be delivered to the chute 469, and pass out of the machine.

It is obvious that a hand feed could, if desired, be used in place of an automatic feed, or any other suitable automatic feed could be used in place of the automatic feed which we have shown. Such a hand feed might consist of a plain card slot, the card being inserted or removed by hand, or the card inserted by hand and after punching removed from the machine by the ejector rolls in the manner already described.

*Resetting mechanism.*—This is specially illustrated in Figs. 2, 6, 7 and 8.

13 is a reset handle for the purpose of resetting the adding wheels whenever desired. The arm 163 to which this handle is connected is secured to a short shaft 164: (Figs. 2 and 7) on this shaft is mounted a rocking arm 165. Pivoted to this is a link 166 pivoted to an arm 167, the latter mounted upon rock shaft 135. Pivoted to a universal bar 168 extending from between the two arms 136 are a series of reset levers 169, one for each of the adding wheels 9. Each reset lever has a cam slot 170 through which passes a stationary stud 171 fixed in the sub-frames 110 and 111. Each reset lever 169 has a toe 172. On each adding wheel 9 are a series of pins 173 spaced ten teeth apart. The toes 172 of the reset levers are normally out of the path of pins 173. When the reset handle is turned by means of the connections above described the reset levers are thrown to the left and the cam slot 170 and the fixed stud 171 causes the toes 172 to be moved up into the path of rotation of the pins 173 and to be then moved circumferentially along that path to the left as shown in Fig. 6. In this movement the toes 172 pick up the pins 173 and move wheels 9 until the pins 173 are in the position occupied by them when the wheel is in its normal or zero position. This movement also moves the total adding wheels back to their zero position and brings the pins 114 on carrying wheels 112 back to their original zero positions. The cam slot 170 is so shaped that the first movement of toe 172 is substantially a vertical one, while the second movement carries the toe in a curved path concentric with shaft 109. This operation collects the pins 173 in whatever position they may be and returns them to the zero position.

After reset handle 13 has been pulled forward to reset the adding mechanism it and its connecting parts are returned to their original positions by means of a spring 174 secured to arm 165. The forward movement of arm 136 has carried forward the universal bar 137, bringing it into contact with the upper portion 138 of the locking levers 118 pushing them forward and releasing the carrying levers 115 in the same manner that the bar 141 released them. This operation returns the carrying mechanism to its original position. The stud 175 (Fig. 6) acts as a binding stud for the two arms 136.

*Interlock between the main handle and the reset handle.* — This is more particularly shown in Figs. 8 and 38.

It has been found important in practice to interlock the main handle with the reset handle so that only one of them can be operated at a time; when one has been started the other will be locked until the first one has completed its work. This may be accomplished in any desired manner. The devices shown in the drawings for this purpose are as follows: Mounted upon the main handle shaft 15 is a sectoral plate 176 and upon the reset handle shaft 164 is mounted a corresponding plate 177, the direction of rotation of the shafts 15 and 164 is indicated by the arrows in Fig. 8. Referring now to Fig. 38 in which these two plates are shown in section together with the arrows indicating the direction of movement, there is mounted upon the base of the machine a bracket 178 which forms the inner bearing for the shaft 164. Passing through the other part of the bracket is a cylindrical opening 179 in which is loosely mounted a hard steel stud 180. Each of the plates 176 and 177 has in it a depression 181 adapted to receive the rounded end of stud 180. The length of stud 180 is such that it occupies the entire opening 179 and one of the cuplike depressions 181. These cuplike depressions are made slightly cam shape. If either plate 176 or 177 is revolved slightly in the direction of its arrow this cup will force the steel stud 180 out of the cup and into engagement with the other cup locking the plate of the latter. This locking will remain effective until the handle connected with the locking plate has completed its full movement. It will thus be seen that the interocking mechanism is under the control of both the main handle and the resetting handle and is thrown into operation by the handle that first starts its movement.

*Detector pins and signal.*—This is specially shown in Figs. 5, 9, 14, 23, 37 and 40.

Referring particularly to Fig. 5, it will be noted that situated at the lower left hand of the card slot, when looking toward the front of the machine, are two detector pins 488 and 540 mounted on the top 489 of a rock lever 490 loosely mounted on a shaft 545 supported in the side frames of the machine. Fixed on this shaft 545 is a lever arm 491 having at its outer end cam roller 492 which coacts with a cam 493 which is mounted on shaft 470, the latter making one revolution at each operation of the machine as already described. Mounted on a rock shaft 347 supported in the side frames of the machine is a rock lever 497 having at its rear end a cam roller 495 adapted to coact with cam 494 and having pivotally mounted at the same point a link 496 which has its other end attached to a feeler arm 497 loosely mounted on shaft 530 supported in the side frames of the machine. The other end of rock lever 497 has pivotally connected to it a link 498 which has its other end attached to the rear portion of rock lever 541 which is loosely mounted on shaft 333 extending across the machine.

500 is a trip plate pivotally mounted on the shaft 92 supported in side arms 93 and 9 which carries the type sectors 4. The rear end of this trip plate 500 has pivoted to it a connecting link 499 which has its lower end attached to the forward end of lever 541. The lever 500 has at its forward end a head portion 502 having two indentations 503, 504 cut therein.

Loosely mounted on the sector supporting shaft 92 is an annunciator signal 506 the face of which is visible through the opening 507 which is in the casing of the machine. Directly behind the face of the signal plate is mounted a spring-pressed pawl 508 which has its point resting on pin 509 mounted on a lever 510 which is pivoted at 511 to the side arm 93 of the sector support. The other end of lever 510 has a cam roller 512 which coacts with a cam 513 mounted on the main cam shaft 95 of the machine. Lever 510 is held by a spring so as to press cam roller against cam 513. Annunciator signal has the upper portion of its face colored red and the lower portion white. The plate 506 of this signal has a dependent portion 544 adapted to coact with a pin 519 which is mounted on an arm 514 fastened to clearing rock shaft 15. Plate 506 also carries fastened to it an extension 543 which performs the same function as extension 292 of the printing mechanism and serves through its cross-over to operate the inside one of the plates 276 on the side of the machine and causes the hammer to operate to print either the cross or dagger as the case may be.

Plate 500 carries with it a type sector having a type 396 for printing a # when a card is fed wrongly and a type 397 for printing + when a card fails to feed at all.

The two detector pins 488 and 540 are so arranged that when a card is in proper position and the pins are pressed against it, the top pin is restrained by the card and the lower one goes through the cut-away portion or clipped corner of the card and passes through the card slot.

When no card is present the pins both pass through the card slot and when a card is fed in wrong position both pins are restrained by the card and neither one passes into or through the card slot.

The operation of these parts is as follows: Each time that the machine is operated the shaft 470 revolves one revolution and the cam 494 acting on roller 495 allows the feeler arm 497 to drop and determine the position of detector pins 488, 540. At each revolution of shaft 470 the pins 488, 540 are pressed toward the card by the cam 493 moving arm 491 and the pin supporting arm 490. If a card is inserted in the slot and fed properly, the pins move to the position shown in perspective in Fig. 37; that is, the upper pin has been restrained by the card and the lower one has passed across the card slot. If no card is fed both pins pass across the card slot and the feeler arm 497 comes down on top of the upper pin 488 and stops there. If, however, a card is fed so that the clipped corner is not in proper position, then both pins are restrained by the card and the feeler drops to its lowest position. It will be seen that feeler 497 has three possible positions each time the machine operates. If no card is fed, the feeler is in its uppermost position; if a card is properly fed, the feeler is in the middle position and if a card is improperly fed, the feeler drops to its lowest position. Through the accompanying links and levers rock plate 500 has three corresponding possible positions and will bring the top notch 504 opposite the toe of 510 when no card is fed, opposite the flat place between the indentations 504, 503, when the card is properly fed, and opposite indentation 503 when a card is improperly fed. Each operation of this plate 500 also causes the type # to be brought to the printing line when both pins pass through as when no card is fed, a blank space to be brought upon the printing line when a card is correctly fed, i. e., when the upper pin is restrained by a card and the lower passes through the clipped corner of the card and through the card slot and the type + to be brought upon the printing line when a card is fed incorrectly and neither pin passes across the card slot. In the subsequent printing operation, if no card is present the character will be printed upon the record strip 252, as shown in the item "94.75 #" printed at 396 in the item column 398, Fig. 36, opposite the number "12" in the character identifying column 399. If a card is present but is improperly positioned or fed, the character + will be printed as at 397 opposite "425.00". If a card is properly positioned or fed, neither character will be printed, as in the case of the other items printed on strip 252, Fig. 36.

It will be seen that if a card is omitted or improperly fed, the plate 500 will stop with one of the indentations opposite the toe of 510 so that when lever 510 is allowed to rock by the movement of cam 513 it will move into one or the other indentations and will release the pawl 508, allowing the annunciator signal to drop and change to red. This will stay down until the operator clears the machine, when the arm 514 will move and the pin 519 will act on the dependent portion 544 of 506 and restores it to its latched position. This gives a method by which the operator can determine from the signal that some card is missing or has been improperly placed or fed, and an inspection of the listing strip will show at a glance which record cards are missing or incorrectly punched, due to the fact that they were in incorrect position in the machine.

Our improved detector device thus gives any one of three indications, one when no card is present, another when a card is present but is improperly positioned or fed, and still another, a negative one, when a card is positioned and fed properly. The indications thus given may be made in any suitable way. We have shown them in one form as visual signals, in another as recorded indications on the record strip 252. The form of the detector device may, of course, be widely varied. As shown, it consists of two parts, the two detector pins and their connections, the pins adapted, when not restrained by an opposing part of a card, to pass through the card slot and affect control of the indications to be given.

The card may be made of any suitable material and may have any suitable shape adapted to enable it to coöperate with the detector pins. In the form shown, it is unsymmetrical, having a part cut away, viz., a corner clipped off. Of course, the cut-away portion may be made in any suitable way, or of any suitable form, or the part restraining the upper pin might appear as a projection from the card, as shown in Fig. 40, rather than as a part cut away, although even in this case the result has been reached by cutting away a part of the card in effect.

*Release and repeat keys.*—These are specially illustrated in Figs. 3, 4, 6, 7 and 25.

The release key is provided in case an error should be made in depressing the keys to permit the keys to be returned to their normal positions without operating the machine. A repeat key is also provided to permit the same number to be printed and added successively a plurality of times without again depressing the keys. The mechanism for these purposes shown in the drawings consists of the following: 182 is a wheel fast on shaft 14 at the extreme left of the machine. This wheel is provided with a cam 183 having a cut away portion as shown near the top in Fig. 6. 184 is a pin mounted in the side of wheel 182. On a rock shaft 185 which extends between the side frames of the machine is mounted a universal bar 186 carried by the side arms 187 (Fig. 3); also mounted upon its rock shaft 185 is a lever 188, held normally in the position shown in Fig. 6 by means of a coil spring 189 (Fig. 3) coiled around shaft 185 and having one end extending under universal bar 186. This arm 188 has a right angular extended portion 190. This is cam shaped and upon it acts pin 184. Upon the right-hand end of shaft 185 is mounted an arm 191 which coacts with a pin 192 mounted upon the shank of repeat key 193. A spring 202 holds this key normally in its upward position. The arm 188 has an extended portion 195 which coacts with the pin 196 (Fig. 7) mounted on the shank of the release key 197. This release key is held in a normal upright position by spring 198. It will be noted by reference to Fig. 6 that the universal bar 186 lies contiguous to the pawls 58 of the keyboard mechanism. Upon the arm 188 is mounted a pin 199 (Fig. 3) which extends over and coacts with the arm 187.

The operation of the above mechanism is as follows: One or more keys having been depressed the universal bars of the series containing the keys depressed are locked in their down position and the tails 58 corresponding therewith occupy their rear position. If it is desired to release the keys that have been depressed pin 199 forces arm 187 downward and rocking universal bar 186 downward and forward against the pawls 58 of the keys that have been depressed. This will unlock the universal bars from their connections permitting them and their connections to return to their normal positions. This release of the universal bars through their tails 58 is also accomplished at the end of each operation of the machine by pin 184 striking against the rear end of arm 188 and moving pin 199, rocking universal bar 186 downward and to the left in the same manner. If, however, it be desired to print or add the same number a second or any successive number of times, this can be done without again depressing the same keys. In that case the repeat key 193 is depressed and as long as it remains down and the main operating handle is turned the same number will be printed upon the recording strip and will be added upon the adding wheels. The depressing of key 193 brings shoulder 200 of its shank under pin 201 (Fig. 4) in which position the repeat key is held by spring 194 and locked in its down position, where it will remain until the operator releases it by pulling the key slightly forward to disengage shoulder 200 from pin 201. The depression of repeat key 193 causes pin 192 to press upon arm 191 of rock shaft 185 rocking the shaft in such a direction that the cam portion 190 of arm 188 is depressed so that pin 184 on wheel 182 will pass entirely over it without striking it. The main driving handle can therefore be operated without releasing the keyboard mechanism.

It is found important to prevent the release of the keys that have been depressed by the operation of the release key after the main operating handle has started in its movement. In order to accomplish this the wheel 182 is provided with the rim 183. This rim prevents the raising of arm 188 with its accompanying cam 190 by means of pressure upon the release key 197 and the consequent release of the keyboard mechanism. The only position in which the release key can be operated is when the machine is at rest with the opening in the rim 183 at the top of the wheel in the position shown in Figs. 3 and 6.

*Clearing signal.*—This is specially illustrated in Figs. 4 and 39.

It has been found advisable in practice to have a signal to indicate the condition of the machine, that is, whether it is in the zero or non-operated condition or whether numbers have been printed and added. For this purpose, we provide a signal which we will speak of as the clearing signal. As shown it consists of a curved plate 320 pivotally mounted on a stud 321 and opposite an opening 322 in the front casing of the machine. On this signal appear the words "Clear" and "Not clear". When the word "Clear" stands opposite the opening it means that the machine has not been operated but stands in the zero position. This signal is mounted immediately in front of the cents setting plate 276. No matter what the first amount is that is set up the cents hammer setting plate 276 always moves in order to print at least the zeros of the cents column. In this rocking forward movement the cents plate 276 plays against an arm 323 connected with the sector carrying the clearing signal. This rocks the plate downward bringing the words "Not clear" opposite the opening of the machine.

The signal is positively held in any position to which it is moved by means of a pin 324 on an arm depending from and forming part of the plate bearing sector and a notched spring 325 provided with two notches (Fig. 4). When the machine is reset at zero the signal is restored to its clear position by means of a link 326 pivoted to a bell-crank lever 327 mounted in the rear of the machine. Upon the shaft 135 of the resetting mechanism already described is mounted just opposite of the right-hand sub-frame 111 a disk 328 which carries a pin 329. In the return of the resetting shaft this pin restores the clearing signal to its clear position.

*The counter and its mechanism.*—These are specially illustrated in Figs. 1, 2, 4, 15, 16, 17, and 18.

It has been found desirable in practice in adding the amounts of checks or any other series of papers involving numbers to be added that a record should be automatically kept by the machine of the number of operations or manipulations, so as to act as a check on the number of record cards used. For example, when the operator has added up the amounts taken from fifty checks say, the machine should have an indicator which should stand at 50, and fifty cards should have been punched with corresponding data.

At the right hand upper portion of the keyboard are shown the dials 368 of such a counter. This counter is shown in details in Figs. 15, 16, 17 and 18. This mechanism consists of a shaft 369 having a knurled wheel 370 outside of the casing of the machine. Mounted on this shaft are three wheels, 371, 372, and 373. The wheel 373 carries a ratchet 374 and alongside of it a ten toothed gear wheel 375. The second wheel 372 carries a ten toothed gear 376 and wheel 371 a ten toothed gear 377. Immediately in the rear of shaft 369 is a stationary shaft 378 which is mounted in the side plates 379, 380 which form the frame of the counter. Mounted upon shaft 378 is a sleeve 381, which carries a ten toothed gear 382 and a one toothed gear 383; mounted and in mesh with gear 376 is a similar sleeve 384 which has a one toothed portion 385. Mounted upon shaft 378 is a pawl carrying plate 386 having a spring pressed pawl 387 mounted upon it and which co-acts with the ratchet wheel 374. This pawl carrying plate has a depending portion 388 which is acted upon by each operation of the driving mechanism by a pin 389 (Fig. 4) mounted on plate 17.

The forward motion of the driving mechanism causes pin 389 to strike pin 388 to communicate with the next lower tooth of ratchet wheel 374 and thus feed that ratchet wheel one step forward. After wheel 374 has been turned its full complement and at the time when it goes from 9 to zero, the one toothed portion of sleeve 381, which has meanwhile been turning step by step, acts upon gear 376 of wheel 372 moving it forward one step. When these two wheels have reached 99 the one toothed portion 385 of sleeve 384 acts upon gear 377 of wheel 371 moving it one step forward. Each one of the wheels carries recessed within it a pawl 390 (Fig. 17.) Each pawl is normally pressed toward shaft 369 by spring 391. Shaft 369 has a slot 392.

It will be seen that each operation of the machine will cause the numeral wheels to add one so that the counter will always show the number of operations or additions that have been made, providing that the counter is set at zero at the same time that the main machine is reset. The counter may be set at zero by taking hold of knurled wheel 370 and revolving it in a direction such that the tooth or slot 393 on shaft 369 will pick up the pawls 390 of the numeral wheel in whatever position they may chance to be. In this way the wheels may be moved back to zero.

Immediately in the rear of the counter and on the outside of the casing is a knurled wheel 393 which controls an eccentric 394 (Fig. 4) mounted on the shaft 395 of the knurled wheel. The eccentric being turned throws the lower portions 388 sufficiently far forward so that the pin 389 will miss it. In this way by turning knurled wheel 393 the counting apparatus may be thrown out of operation whenever it is found desirable not to use it.

*Front ink ribbon feed.*—This is specially illustrated in Figs. 3, 5, 6, 12, 29 and 30.

The front ink ribbon extends across and over the individual type sectors in about the same relation that the rear ink ribbon occupies with the total type wheels. 407 are the two rollers upon which this ink ribbon is wound. One roll is mounted in a casing 408 which forms a bridge between the upper left-hand frame and the inner left-hand sub-frame 110. The other roll is mounted in a casting 409 which bridges between the inner right-hand sub-frame 111 and the outer right-hand main frame.

Referring to Fig. 29 it will be seen that upon the casing 408 are mounted three guide rolls, 410, 411, and 412. The type ribbon 413 passes from roll 407 over roll 410, under 411, over 412, then over the type sectors and around similar rolls 412, 411 and 410 on the other side of the machine to the other roll 407.

Upon the shaft 414 upon which the left-hand roll 407 is mounted there is secured a ratchet wheel 415 by means of which the ribbon is fed in one direction. There is a similar ratchet wheel 415 mounted upon the shaft 414 of the other roll. Mounted upon a stud 416 is a stop pawl 417 which at times engages with ratchet wheel 415. This pawl carries a counter-balance portion 418 which co-acts with a pin 419 mounted upon a pawl carrying plate 420. The inner upper portion of this plate carries a pawl 421 which pawl acts to feed the ratchet wheel when in operative position. It will be understood that these parts are duplicate on each half of the inking ribbon feeding mechanism.

The lower end of pawl carrying plate 420 is attached to a rock arm 422 (Fig. 5) which serves to actuate it. Rock arm 422 is mounted upon a rock shaft 423. This shaft carries in the center of the machine an arm 424 (Fig. 6) carrying a cam roller 425 bearing upon cam 426 on cam shaft 95. Referring to Fig. 12 it will be seen that shaft 423 carries an actuating arm 422 at each end, one for each portion of the inking ribbon feed mechanism.

Mounted upon a depending portion at the forward part of each of the plates 408 and 409 is a lever 427 which carries at its upper end two laterally extending pins 428 between which the ink ribbon passes. The lower parts of these levers 427 are connected by a rod 429. Secured to both parts of plate 420 is a connecting rod 430, which as shown is bent downward in order that it may pass freely between the operative parts of the machine. This rod 430 has an enlarged portion 431 which has a rectangular opening 432. Attached to stud 433 upon which the right-hand portion of lever 427 is loosely secured, is also mounted a depending lever 434 which carries a loosely mounted roll 435 and on its lower end a roll 436. A pin 451 on lever 427 enters a hole in lever 434. Preferably the pin fits loosely in the hole. Motion is thus communicated from 427 to 434. This roll 436 extends through the opening 432 of connecting link 430.

The ink ribbon carries near each end secured to it a rivet or button 437 shown at the left end of Fig. 29. This button is so large that it is incapable of being drawn through the space between the two pins 428. The loosely mounted roll 435 co-acts with one or the other of two notches 438 in an impositive lock spring 439 mounted upon the frame work of the machine.

The operation of the various parts is as follows: Referring particularly to Fig. 29, as there shown pawl 421 of the right-hand unit is in operative position with its ratchet wheel 415 and stop pawl 416 is also in engagement with the ratchet wheel. In this position of the parts the loosely mounted roller 435 occupies the right-hand notch 438 of spring 439 and the roll 436 is in the right-hand corner of the rectangular opening 432. In this position of the parts the ink ribbon is being fed toward the right as viewed in Fig. 29. The pressure of roll 436 in the right-hand corner of the opening 432 is sufficient to keep feed pawl 421 in operative connection with its ratchet wheel and at the same time to hold the left-hand pawl 421 out of engagement with its ratchet wheel. Pin 419 of the left-hand unit is pressing against the counterweight 418 of left-hand locking pawl 417 and has revolved it sufficiently to throw it out of engagement with its ratchet wheel. When through the oscillations of shaft 423 the pawl carrying plate 420 has been vibrated a sufficient number of times to feed the ink ribbon to the right sufficiently far, button 437 will strike against pins 428 and being unable to pass through between them it will push the pins to the right and revolve levers 427 about their center. This pressure continues until it is sufficient to cause the loosely mounted roll 435 to move slightly upon the projecting portion of the right-hand notch 438. During this movement roll 436 has moved freely in slot 432. This slot is made rectangular in order to allow for the vertical vibration of the connecting link 420 and the sidewise movement of roll 436 at once. When lever 427 has moved sufficiently to the left, the roll 435 snaps suddenly out from the right-hand notch into the left-hand notch. This operation takes place very suddenly owing to the fact that the roll 435 is loosely mounted. This causes roll 436 to suddenly strike the left-hand end of opening 432 a sharp blow sufficiently strong to give a sudden tip toward the left of the pawl carrying plates 420 and to throw the left-hand pawl 421 and stop pawl 417 into engagement with their ratchet wheel and to free the corresponding parts on the other side of the feeding mechanism. The continued oscillation of shaft 423 will then cause the ribbon to move in a reverse direction.

*Rear ink ribbon.*—This is specially illustrated in Figs. 2, 3 and 5.

Referring to Fig. 3 it will be noticed that at the rear are the rear ink ribbon rolls 400. These rolls are mounted in the casings 401, which casings form bridges between the sub-frames and the outside main frames. These rolls are preferably arranged so that the line of feed of the ink ribbon will be at an angle to the line of the type. The rolls can be removed from their supports by taking off the knurled thumb piece 402 and the ribbon can be fed by means of the knurled thumb piece 403 on the outside of the side of the machine. These knurled thumb pieces are connected to the shaft carrying the ink ribbon rolls by means of the bevel gears 520. 404 are idle rollers over which the ink ribbon passes which carry the ribbon up above the type and in close relation to the steel plate 405 (Fig. 2) which is let into the top plate of the machine and which carries the opening 406 through which the hammers act upon the paper and rear ink ribbon against the type of the total adding wheels.

*Record card and listing strip.*—Fig. 34 shows a record card 445 ready to be placed with others on the feeding platform 516 of the machine. As shown the card has printed upon it the two rows of character identifying digits 446 which correspond to the character identifying keys on the keyboard with the exception of the zeros which are printed or punched automatically by the machine as has been previously described. The five rows of digits 447 of the item adding columns are also printed on the card and correspond with the item keys of the keyboard with the exception of the zeros. The lower right hand corner 505 of each card is clipped off so as to coact with detector pins 488, 540 as already described.

It will be noted that the record card 445 is much longer than needed for the purpose of recording the identifying number and the amount to be added. Any other data that are desired may be printed in this place and the holes representing the data of an operation of the machine may also be punched in this part of the card by hand or be punched by suitable mechanism adapted for the purpose, or the rows of punches may be extended or duplicated with suitable connecting operating mechanism in the machine which we have described.

Fig. 35 shows a record card which has passed through the machine. The punched holes 450 of the character identifying columns show that in the particular example given the character identifying number is 30 and the punched holes 449 show that the amount punched in the five item or digit columns is 86210 representing the amount in dollars and cents. It will be understood, of course, that the items may be of values other than dollars and cents.

Fig. 36 shows a portion of a listing strip 252 which has been used in the machine. This list has opposite each item amount the corresponding identifying character or number 399. It will be noted that the fifth item is the same as is punched in the card as shown in Fig. 35. The data on the card and corresponding imprint on the listing strip were made at the same time and at a single operation of the machine.

Fig. 36 shows a portion of a listing strip having imprinted on it various items with their identifying numbers. For each of these items a corresponding record card is punched. The sixth item with the cross 396 shows that a card was inserted wrongly and the tenth item with the dagger † 397 printed at the end shows that the machine missed feeding a card and that this card is missing from the pile of those which the machine has punched.

The strip has the total of the items at the bottom which is obtained by pushing the carriage to its rearmost position as has been already described. The listing strip used in the machine may be a single short strip of paper, removably if desired, or a web or roll of paper mounted permanently in supports 487 as shown in Figs. 1 and 6.

In the machine shown in the drawings, the items that are recorded are amounts of money, dollars and cents. The items may, of course, be other data than dollars and cents or amounts of money. The identifying characters shown as recorded opposite the respective items in the record strip shown in the drawings, are numbers, but it will, of course, be understood that other characters may be employed, if desired. The controlling and operating devices enabling the operator to control the item and character recording mechanisms, the totalizing devices and the punching mechanism, may, of course, be varied widely from those shown. Thus, for example, it is not necessary that the punching mechanism should be controlled through the recording mechanisms. It might be controlled directly from the keys themselves, or any part of the mechanism controlled by those keys.

Many other changes and modifications than those specifically set forth in the above specification may be made, without departing from our invention.

By means of our improvement a permanent record can be made of different items, each identified by its particular identifying character, the amount of each item can be added or totalized, and at the same time a separate record can be made upon the removable cards, preferably one item and its identifying character for each card, and from these cards sub-totals may be easily and quickly obtained and preferably automatically as in an integrating machine. Thus, in a bank the items might represent the amounts of checks deposited, the identifying characters the different banks of, say, a clearing house association upon which the checks are drawn, the record strip would give a complete record of all of the items with their identifying characters, a total could be taken at any time upon this record strip, and by sorting the cards in accordance with any identifying character, either manually or by means of an integrating machine, a sub-total could be obtained of all of the checks bearing such identifying number, and at the close, the total of the sub-totals could be made to verify the total upon the record strip.

Our invention may, of course, be used for other purposes than in the specific illustration given as, for example, in department stores, etc., wherever it is desired to separate a series of items into sub-classes and obtain the totals of such sub-classes.

By means of our improved detector devices signal indications, either visual or addressed to the eye alone, or record, or of any suitable character, may be given to indicate any one of three conditions, the absence of a card, the presence of a card properly positioned, or the presence of a card improperly positioned. The record indications are made upon the record strip opposite the items affected. These records show at a glance that for a particular item no card was fed, or that the card was improperly positioned, and the defect may be at once remedied.

What we claim as new and desire to secure by Letters Patent is:

1. In a machine of the class described, the combination of the following instrumentalities, mechanism for supporting and feeding a printing surface, mechanism for impressing thereon any desired items, mechanism for also impressing thereon characters identifying the different items, and selective punching mechanism for punching holes in a separate card representing by their location on such card the value of an impressed item and also its identifying character.

2. In a machine of the class described, the combination of the following instrumentalities, mechanism for supporting and feeding a printing surface, mechanism for impressing thereon any desired items, mechanism for also impressing thereon characters identifying the different items, selective printing mechanism for punching holes in a separate card, and connections between the item and character identifying mechanism and the selective punching mechanism adapted to cause the latter to move in accordance with the movements of the impressing mechanism, and to punch holes in the card representing by their location thereon the value of an item and its identifying character.

3. The combination of mechanism for supporting and feeding a paper strip, mechanism for recording items thereon, mechanisms for also recording characters thereon identifying different items, and selective punching mechanism for punching holes in a suitable card representing by their location on the surface thereof the value of an item recorded and its identifying character, and controlling devices, manually operated, adapted to control the nature and extent of movement of the recording mechanism and the punching mechanism to cause them to record and punch in accordance with the operation of the controlling devices.

4. The combination with mechanism for supporting and feeding a paper strip, mechanism for recording items thereon, mechanism for also recording characters thereon identifying different items, selective punching mechanism for punching holes in a suitable card, representing by their location on the surface of the card the value of an item recorded and its identifying character, and controlling devices, manually operated, adapted to control the nature and extent of movement of the recording mechanism and the punching mechanism and connections between the controlling devices and the recording mechanism and punching mechanism to cause them to record and punch in accordance with the operation of the controlling devices.

5. The combination of mechanism for supporting and feeding a paper strip, mechanism for recording thereon different items, mechanism for also recording characters thereon identifying different items, and selective punching mechanism for punching holes in separate and removable cards representing by their location on the card the value of an item recorded and its identifying character.

6. The combination of mechanism for supporting and feeding a paper strip, mechanism for recording thereon different items, mechanism for also recording thereon characters identifying said different items, and selective punching mechanism for punching holes in separate and removable cards representing by their location on the card the value of an item recorded and its identifying character, and feeding devices for automatically feeding cards individually to the punching mechanism.

7. The combination of mechanism for supporting and feeding a paper strip, mechanism for recording thereon different items, mechanism for also recording thereon characters identifying different items, a totalizing device for totalizing on the strip the items as they are recorded, and selective punching mechanism for punching holes in a separate card representing by their location on the card the value of an item recorded and totalized and its identifying character.

8. The combination of mechanism for supporting and feeding a paper strip, mechanism for recording items thereon, mechanism for also recording thereon characters identifying different items, a totalizing device for totalizing thereon the items as they are recorded, and selective punching mechanism for punching holes in separate and removable cards representing by their location on the card the value of an item recorded and totalized and its identifying character, and controlling devices, manually operated, adapted to control the nature and extent of movement of the recording and totalizing mechanism and the punching mechanism and connections between the controlling devices and the recording and totalizing mechanism and punching mechanism to cause them to record totals and to punch holes in the removable cards in accordance with the operation of the controlling devices.

9. The combination of mechanism for supporting and feeding a paper strip, mechanism for recording different items thereon, mechanism for also recording thereon characters identifying different items, and selective punching mechanism for punching holes in a separate and removable card representing by their location thereon the value of an item recorded and its identifying character, a bank of keys representing different denominations of value and units thereof, a bank of keys representing different identifying characters, and connections between the keys of the respective banks and the recording mechanism and punching mechanism to cause them to record and punch in accordance with the values of the keys operated.

10. The combination of mechanism for supporting and feeding a paper strip, mechanism for recording different items thereon, mechanism for also recording thereon characters identifying said different items, selective punching mechanism for punching holes in separate cards representing by their location on the card the value of an item recorded and its identifying character, and means for automatically feeding said record cards to punching position and then removing said cards from such position on the completion of the punching operation.

11. In an indicating machine adapted for use with removable cards, a detector device adapted to give one indication, if no card be present, and another indication, if a card be improperly positioned.

12. In an indicating machine adapted for use with removable cards, a detector device adapted to give any one of three indications, one indicating the absence of a card, another that a card has been properly fed or positioned, and still another indicating an improper feeding or positioning of the card.

13. In a recording machine adapted for use with removable cards, a detector device adapted to cause a record to be made upon a suitable record surface, one indication, if no card be present, and another indication, if a card be improperly positioned.

14. In a recording machine adapted for use with removable cards, a detector device adapted to cause any one of three indications to be recorded upon a suitable record surface, one indication indicating the absence of a card, another that a card has been properly positioned, and still another indicating an improper positioning of the card.

15. The combination of an indicating device, adapted to give any one of three indications, one an indication of the absence of a card, another of the presence of a card properly positioned, and still another of the presence of an improperly positioned card, and two detector devices adapted, when both are in operative position, to cause the indicating device to give one of said indications, when only one is in operative position to cause the indicating device to give another of said indications, and when neither is in operative position to cause the indicating device to give still another of said indications.

16. The combination of an indicating device, adapted to give any one of three indications, one an indication of the absence of a card, another of the presence of a card properly positioned, and still another of the presence of an improperly positioned card, and two detector devices adapted to control the indication of the indicating device to cause it to give one of said indications when one of the detector devices controls the indicating device, another indication when the other detector device controls it, and still another of said indications when neither of said detector devices controls it.

17. The combination of a recording device adapted to give any one of three record indications, one of the absence of a card, another of the presence of a card properly positioned, and still another of the presence of an improperly positioned card, and two detector devices adapted, when both are in operative position, to cause the recording device to record upon a suitable record surface one of said indications, when only the one detector device is in operative position to cause the recording device to make another of said record indications, and when neither is in operative position to cause the recording device to make still another of said record indications.

18. In an indicating machine adapted for use with removable cards, the combination of a detector device adapted to give one indication, if no card is present, and another indication, if a card is improperly positioned, and a card so shaped as to coöperate, when improperly positioned, with the detector device to cause it to give said second indication.

19. In an indicating machine adapted for use with removable cards, the combination of a detector device adapted to give any one of three indications, one indicating the absence of a card, another the presence of a card properly positioned, and still another indicating the improper positioning of the card, and a card so shaped as to coöperate with the detector device to cause it to give the second of said indications when the card has been properly positioned and the third indication when the card is improperly positioned.

20. In a recording machine adapted for use with removable cards, the combination of a detector device adapted to cause to be made upon a suitable record surface one record indication, if no card is present, and another record indication, if a card is improperly positioned, and a card so shaped that, when improperly positioned, it will coöperate with the detector device to cause it to make the second of said record indications.

21. In a recording machine adapted for use with removable cards, the combination of a detector device adapted to cause to be made upon a suitable record surface any one of three record indications, one denoting the absence of a card, another the presence of a card properly positioned, and still another the presence of an improperly positioned card, and a card so shaped as to coöperate with the detector device to cause it to make the second of said record indications when the card is properly positioned, and the third of said record indications when the card is improperly positioned.

22. In an indicating machine adapted for use with removable cards, the combination of a detector device adapted to give two separate indications, and a card so shaped as to cause the detector device to give one of the said indications if the card is improperly positioned, and the other of said indications if the card is properly positioned.

23. In an indicating machine adapted for use with removable cards, the combination of a detector device adapted to give two separate indications, and a card having an unsymmetrical part so shaped as to cause the detector device to give one of the said indications if the card is improperly positioned, and the other of said indications if the card is properly positioned.

24. In an indicating machine adapted for use with removable cards, the combination of a detector device adapted to give one indication, if no card is present, and another indication, if a card is improperly positioned, and a card having an unsymmetrical part shaped and arranged so as to cause the detector device to give the second of said indications if the card is improperly positioned.

25. In an indicating machine adapted for use with removable cards, the combination of a detector device adapted to give any one of three indications, one denoting the absence of a card, another that the card has been properly positioned, and still another denoting an improper positioning of the card, and a card having an unsymmetrical part shaped so as to coöperate with the detector device to cause it to give the second or third of said indications, depending upon whether the card is properly positioned or improperly positioned.

26. In an indicating machine adapted for use with removable cards, the combination of a detector device adapted to give any one of three indications, one denoting the absence of a card, another that the card has been properly positioned, and still another denoting an improper positioning of the card, and a card having a cut-away portion, the card and its cut-away portion being arranged so as to coöperate with the detector device to cause it to give the second or third of said indications, depending upon whether the card is properly positioned or improperly positioned.

27. In an indicating machine adapted for use with removable cards, the combination of a detector device adapted to give any one of three indications, one denoting the absence of a card, another that the card has been properly positioned, and still another denoting an improper positioning of the card, and a card having a clipped corner, the card and the clipped corner being arranged so as to co-operate with the detector device to cause it to give the second or third of said indications, depending upon whether the card is properly positioned or improperly positioned.

28. In an indicating machine adapted for use with removable cards, the combination of signal mechanism adapted to give either one of two different indications, operating mechanism for actuating the signal mechanism, two separate detector pins, each adapted in the operation of the machine to pass through the card slot into the path of the signal operating mechanism unless restrained by an opposing part of the card, and a card so shaped that, when the card is properly positioned in the card slot, one only of the pins will pass through the card slot to control the operating mechanism to cause the signal mechanism to give one indication, and when the card is improperly positioned, neither one will pass through the card slot and the operating mechanism will actuate the signal mechanism to give the other indication.

29. In an indicating machine adapted for use with removable cards, the combination of signal mechanism adapted to give either one of two different indications, operating mechanism for actuating the signal mechanism, two separate detector pins, each adapted in the operation of the machine to pass through the card slot into the path of the signal operating mechanism unless restrained by an opposing part of the card, and a card having an unsymmetrical part, the card and its unsymmetrical part being so shaped that, when the card is properly positioned in the card slot, one only of the pins will pass through the card slot to control the operating mechanism to cause the signal mechanism to give one indication, and when the card is improperly positioned, neither one will pass through the card slot and the operating mechanism will actuate the signal mechanism to give the other indication.

30. In an indicating machine adapted for use with removable cards, the combination of signal mechanism adapted to give either one of two different indications, operating mechanism for actuating the signal mechanism, two separate detector pins, each adapted in the operation of the machine to pass through the card slot into the path of the signal operating mechanism unless restrained by an opposing part of the card, and a card having a portion cut away, the card and its cut-away portion being so shaped that, when the card is properly positioned in the card slot, one only of the pins will pass through the card slot to control the operating mechanism to cause the signal mechanism to give one indication, and when the card is improperly positioned, neither one will pass through the card slot and the operating mechanism will actuate the signal mechanism to give the other indication.

31. In an indicating machine adapted for use with removable cards, the combination of signal mechanism adapted to give either one of three different indications, operating mechanism for actuating the signal mechanism, two separate detector pins, each adapted in the operation of the machine to pass through the card slot into the path of the signal operating mechanism unless restrained by an opposing part of the card, and a card so shaped that, when the card is properly positioned in the card slot, one only of the pins will pass through the card slot to control the operating mechanism to cause the signal mechanism to give one indication, and when the card is improperly positioned, neither one will pass through the card slot and the operating mechanism will actuate the signal mechanism to give the other indication, whereby one indication will be given if the card is properly positioned, another if improperly positioned, and still another indication when the absence of a card permits both pins to pass through the card slot.

32. In a recording machine, the combination with mechanism for recording items upon a permanent record strip in the machine and also upon removable cards, of signal mechanism for recording either one of two different signal indications upon the record strip, operating mechanism for actuating the signal mechanism, two separate detector pins, each adapted in the operation of the machine to pass through the card slot into the path of the signal operating mechanism unless restrained by an opposing part of the card, and a card so shaped that, when the card is properly positioned in the card slot, one only of the pins will pass through the card slot to control the operating mechanism to cause the signal mechanism to record one indication, and when the card is improperly positioned, neither one will pass through the card slot and the operating mechanism will actuate the signal mechanism to record the other indication.

33. In a recording machine, the combination with mechanism for recording items upon a permanent record strip in the machine and also upon removable cards, of signal mechanism for recording either one of three different signal indications upon the record strip, operating mechanism for actuating the signal mechanism, two separate detector pins, each adapted in the operation of the machine to pass through the card slot into the path of the signal operating mechanism unless restrained by an opposing part of the card, and a card so shaped that, when the card is properly positioned in the card slot, one only of the pins will pass through the card slot to control the operating mechanism to cause the signal mechanism to record one indication, and when the card is improperly positioned, neither one will pass through the card slot and the operating mechanism will actuate the signal mechanism to record the other indication, whereby one indication will be given if the card is properly positioned, another if improperly positioned, and still another indication when the absence of a card permits both pins to pass through the card slot.

34. In a computing machine adapted to operate upon removable cards, the combination of signal mechanism and a detector device having two separate parts, each adapted to pass through the card slot, unless restrained by an opposing part of a card, and so arranged and connected with the signal mechanism that different indications will be given by the signal mechanism, depending upon whether one or both or neither of the said separate parts of the detector device pass through the card slot.

35. In a computing machine adapted to operate upon removable cards, the combination of signal mechanism, a detector device having two separate parts, each adapted to pass through the card slot, unless restrained by an opposing part of a card, and a card so shaped that, when properly positioned, the card will oppose one but not the other of said parts of the detector device to give one indication of the signal mechanism, and when improperly positioned, will not oppose either of said parts to give another indication, and when no card is present at all, both parts will pass through the slot and give still another indication.

36. In a computing machine adapted to be used with removable cards, the combination of a record strip, mechanism for recording data thereon, signal mechanism, and a detector device having two separate parts, each adapted to pass through the card slot, unless restrained by an opposing part of the card, and so arranged and connected with the signal mechanism that different record indications will be made upon the record strip, depending upon whether one or both or neither of the said separate parts of the detector device pass through the card slot.

37. In a computing machine adapted to be used with removable cards, the combination of a record strip, mechanism for recording data thereon, signal mechanism, a detector device having two separate parts, each adapted to pass through the card slot, unless restrained by an opposing part of the card, and a card so shaped that, when properly positioned, the card will oppose one but not the other of said parts of the detector device to cause one record indication to be made upon the record strip, and when improperly positioned, the card will not oppose either of said parts and another record indication will be made upon the record strip, and when no card is present, both parts will pass through the slot and cause still another record indication to be made upon the record strip.

38. In a computing machine adapted to be used with removable cards, the combination of a record strip, a detector device adapted to cause one record indication to be made upon the record strip, if no card is present, and another record indication to be made upon said strip, if a card is improperly positioned.

39. In a computing machine adapted to be used with removable cards, the combination of a record strip, a detector device adapted to cause any one of three record indications to be made upon the record strip, one denoting the absence of a card, another the proper positioning of a card, and still another the improper positioning of a card.

40. In a computing machine adapted to be used with removable cards, the combination of a record strip, signal mechanism adapted to cause either one of two different record indications to be made upon the record strip, operating mechanism for actuating the signal mechanism, two separate detector pins, each adapted in the operation of the machine to pass through the card slot into the path of the signal operating mechanism, unless restrained by an opposing part of the card, and a card so shaped that, when the card is properly positioned in the card slot, one only of the pins will pass through the card slot to control the operating mechanism to cause one record indication to be made upon the record strip, and when the card is improperly positioned, neither one of the pins will pass through the card slot and the operating mechanism will cause the other of said record indications to be made upon the record strip.

41. In a computing machine, the combination of mechanism for recording items upon a permanent record strip in the machine and also upon removable cards, a record strip, signal mechanism for recording either one of two different signal indications upon the record strip, operating mechanism for actuating the signal mechanism, two separate detector pins each adapted, in the operation of the machine, to pass through the card slot into the path of the signal operating mechanism to control the same unless restrained by an opposing part of the card, and a card so shaped that, when the card is properly positioned in the card slot, one only of the pins will pass through the card slot to cause one record indication to be made upon the record strip, and when the card is improperly positioned, neither one of the detector pins will pass through the card slot and the other one of the said record indications will be made upon the record strip.

42. In a computing machine adapted to be used with removable cards, the combination of a record strip, mechanism for recording items thereon, mechanism for recording upon the record strip characters identifying the different items, differential punching mechanism for punching holes in the removable cards, connections between the item and character-identifying recording mechanism and the differential punching mechanism adapted to cause the latter to move in accordance with the movement of the recording mechanisms and to punch holes in the removable cards, representing by their location on a card the value of an item recorded and its identifying character, a detector device adapted to make one record indication upon the record strip, if no card is present, and another record indication upon said strip, if a card is improperly positioned.

43. In a computing machine adapted to be used with removable cards, the combination of a record strip, mechanism for recording items thereon, mechanism for recording on said strip characters identifying the different items, a totalizing device for totalizing the items as they are recorded, differential punching mechanism for punching holes in the removable cards, representing by their location on the card the value of an item recorded and totalized and its identifying character, controlling devices, manually operated, adapted to control the extent of movement of the recording and totalizing mechanisms and the punching mechanism, signal mechanism, a detector device having two separate parts each adapted to pass through the card slot, unless restrained by an opposing part of a card, and a card so shaped that, when properly positioned, the card will oppose one but not the other of said parts of the detector device to cause the signal mechanism to make upon the record strip one record indication, and when improperly positioned, the card will not oppose either of said parts to cause another record indication to be made upon the record strip, and when no card is present, both parts will pass through the slot and cause still another record indication to be made upon the record strip.

44. In a computing machine, the combination of a record strip, a visual signal mechanism, a mechanism for recording signals upon the record strip, and a detector device adapted to give one visual indication and a corresponding record signal indication upon the record strip, if no card is present, and another visual and record indication, if a card is improperly positioned.

45. In a computing machine adapted for use with removable cards, the combination of a record strip, a visual signal mechanism, a mechanism for recording signals upon the record strip, and a detector device adapted to give any one of three visual and record indications, one visual and record indication denoting the absence of a card, another a card properly positioned, and still another a card improperly positioned.

46. In a computing machine, the combination of a record strip, a visual signal mechanism, a mechanism for recording signals upon the record strip, a detector device adapted to actuate the visual signal mechanism and the signal recording mechanism to give any one of three indications, and a card adapted to coöperate with the detector device, so shaped that when properly positioned it will coöperate with the detector device to cause one of the visual and record indications to be given and made, and when improperly positioned, to cause another of said visual and record indications to be given and made, and when no card is present, the detector device will be still differently actuated to give the third visual and record indication.

In testimony whereof, we have signed our names to this specification, in the presence of two subscribing witnesses.

HARRY T. GOSS.
JAMES W. BRYCE.

Witnesses:
EDWIN SEGER,
JOHN O. TEMPLER.

Copies of this patent may be obtained for five cents each, by addressing the "Commissioner of Patents, Washington, D. C."